US007191624B2

(12) United States Patent
Beylotte et al.

(10) Patent No.: US 7,191,624 B2
(45) Date of Patent: Mar. 20, 2007

(54) VENDING MACHINE LOCK

(75) Inventors: James E. Beylotte, Indianapolis, IN (US); Ralph P. Palmer, Indianapolis, IN (US); John W. McIntire, Anderson, IN (US)

(73) Assignee: Stanley Security Solutions, Inc., Indianapolis, IN (US)

( * ) Notice: Subject to any disclaimer, the term of this patent is extended or adjusted under 35 U.S.C. 154(b) by 0 days.

(21) Appl. No.: 10/771,078

(22) Filed: Feb. 3, 2004

(65) Prior Publication Data

US 2004/0154363 A1 Aug. 12, 2004

Related U.S. Application Data

(63) Continuation of application No. 10/000,203, filed on Nov. 2, 2001, now Pat. No. 6,684,671.

(60) Provisional application No. 60/276,546, filed on Mar. 16, 2001, provisional application No. 60/245,352, filed on Nov. 2, 2000.

(51) Int. Cl.
*B60R 25/04* (2006.01)

(52) U.S. Cl. ............................ 70/257; 70/208; 70/277; 292/336.3; 292/144; 292/201

(58) Field of Classification Search .................. 70/208, 70/257, 277–283; 292/144, 201, 338.3
See application file for complete search history.

(56) References Cited

U.S. PATENT DOCUMENTS

| | | | |
|---|---|---|---|
| 2,783,617 | A | 3/1957 | Halovatch |
| 2,814,324 | A | 11/1957 | Shur |
| 2,896,496 | A | 7/1959 | Jansen |
| 3,089,330 | A | 5/1963 | Kerr |
| 3,151,652 | A | 10/1964 | Zahodiakin |
| 3,157,215 | A | 11/1964 | Zahodiakin |
| 3,352,341 | A | 11/1967 | Schertz |
| 3,550,412 | A | 12/1970 | Pitel et al. |
| 3,695,139 | A | 10/1972 | Howe |
| 3,751,086 | A | 8/1973 | Geringer |
| 4,067,477 | A | 1/1978 | Chalabian |
| 4,071,271 | A | 1/1978 | Bourrie et al. |
| 4,083,393 | A | 4/1978 | Okada |
| 4,167,104 | A | 9/1979 | Bond |
| 4,171,752 | A | 10/1979 | Pertinen |

(Continued)

FOREIGN PATENT DOCUMENTS

CA 799686 11/1968 .................. 70/208

(Continued)

OTHER PUBLICATIONS

"What is ZipTechnology™?," ZipNut.com, Thread Technology, Inc., 2000.

(Continued)

*Primary Examiner*—Suzanne Dino Barrett
(74) *Attorney, Agent, or Firm*—Baker & Daniels LLP

(57) ABSTRACT

Vending machines are provided having a door and a cabinet having an interior region for storing and distributing objects, such as canned or bottled beverages. Several vending machines locks are provided for locking the door to the cabinet to prevent unauthorized access to the interior region of the cabinet.

23 Claims, 34 Drawing Sheets

U.S. PATENT DOCUMENTS 4,175,989 A 11/1979 Pospischil et al.
4,185,730 A 1/1980 Roes et al.
4,220,024 A 9/1980 Berich
4,232,798 A 11/1980 Hammel et al.
4,268,076 A * 5/1981 Itoi ........................... 292/216
4,299,520 A 11/1981 Iwata
4,350,032 A 9/1982 Kochackis
4,378,187 A 3/1983 Fullerton
4,473,172 A 9/1984 Reynolds
4,568,998 A 2/1986 Kristy
4,589,571 A 5/1986 Sykes
4,594,637 A 6/1986 Falk
4,618,300 A 10/1986 Goebel
4,633,687 A 1/1987 Fane
4,741,454 A 5/1988 Ray et al.
4,764,071 A 8/1988 Lawrence et al.
4,974,888 A 12/1990 Childers
4,986,099 A 1/1991 Johnson et al.
4,993,247 A 2/1991 Minemura
5,027,630 A 7/1991 Stillwagon et al.
5,050,413 A 9/1991 Stillwagon et al.
5,127,508 A 7/1992 Teague
5,131,038 A 7/1992 Puhl et al.
5,143,430 A 9/1992 Craven et al.
5,160,180 A 11/1992 Mlynarczyk
5,197,314 A 3/1993 Stillwagon et al.
5,216,907 A 6/1993 Ullmann
5,269,161 A 12/1993 Stillwagon ..................... 70/34
5,273,183 A 12/1993 Tuttobene
5,324,150 A 6/1994 Fullerton
5,335,818 A 8/1994 Maldanis et al.
5,373,718 A 12/1994 Schwerdt et al.
5,378,100 A 1/1995 Fullerton
5,392,953 A 2/1995 Maldanis et al.
5,427,488 A 6/1995 Fullerton et al.
5,467,619 A 11/1995 Stillwagon et al. ............ 70/34
5,476,190 A 12/1995 Herrmann et al.
5,491,471 A 2/1996 Stobbe
5,497,905 A 3/1996 Vogelpohl et al.
5,548,982 A 8/1996 Rawling
5,575,515 A 11/1996 Iwamoto et al.
5,580,200 A 12/1996 Fullerton
5,613,816 A 3/1997 Cabahug
5,636,881 A 6/1997 Stillwagon
5,647,471 A 7/1997 Ra
5,733,084 A 3/1998 Fullerton
5,774,059 A 6/1998 Henry et al.
5,788,443 A 8/1998 Cabahug
5,791,179 A 8/1998 Brask
5,799,822 A 9/1998 Rudewicz et al.
5,800,108 A 9/1998 Cabahug
5,813,257 A 9/1998 Claghorn et al.
5,823,027 A 10/1998 Glick et al.
5,845,524 A 12/1998 Koehler
5,848,541 A 12/1998 Glick et al.
5,862,693 A 1/1999 Myers et al.
5,921,119 A 7/1999 Myers et al.
5,936,544 A 8/1999 Gonzales et al.
5,975,348 A 11/1999 Rudewicz et al.
6,038,892 A 3/2000 Schmitt
6,046,681 A 4/2000 Solop
6,050,447 A 4/2000 Kovens et al.
6,068,305 A 5/2000 Myers et al.
6,082,153 A 7/2000 Schoell et al.
6,129,238 A 10/2000 Rumminger
6,345,522 B1 * 2/2002 Stillwagon et al. ........... 70/277
6,351,977 B1 3/2002 Pedroso et al.
6,496,101 B1 * 12/2002 Stillwagon ................. 340/5.61
6,525,644 B1 * 2/2003 Stillwagon ................. 340/5.61
6,575,504 B2 * 6/2003 Roatis et al. ............... 292/199
6,581,986 B2 * 6/2003 Roatis et al. ............... 292/199
6,684,671 B2 * 2/2004 Beylotte et al. .............. 70/208
6,867,685 B1 * 3/2005 Stillwagon ................. 340/5.64
6,874,828 B2 * 4/2005 Roatis et al. ............... 292/199
6,886,869 B2 * 5/2005 Martinez et al. ............ 292/216
2004/0172991 A1 * 9/2004 Forster et al. ................ 70/257

FOREIGN PATENT DOCUMENTS

JP 403100283 4/1991 .................. 70/208

OTHER PUBLICATIONS

"How does it work?," ZipNut.com, Thread Technology, Inc., 2000.

* cited by examiner

VENDING MACHINE LOCK

This application is a continuation application of U.S. patent application Ser. No. 10/000,203, entitled Vending Machine Lock, filed Nov. 2, 2001, to Beylotte et al., now U.S. Pat. No. 6,684,671; U.S. Pat. No. 6,684,671 claims priority to U.S. Provisional Patent Application Ser. No. 60/245,352, entitled Lock, filed Nov. 2, 2000, to Beylotte et al. and U.S. Provisional Patent Application Ser. No. 60/276,546, entitled Lock, filed on Mar. 16, 2001, to Beylotte et al. The disclosures of the above referenced patent and patent applications are expressly incorporated by reference herein.

BACKGROUND OF THE INVENTION

The present invention relates to a lock. More particularly, the present invention relates to locks used on vending machines.

According to the present invention, a vending machine is provided. The vending machine is configured to retain objects for distribution and includes a cabinet, a door, and a lock. The cabinet defines an interior region sized to receive the objects for distribution. The door is coupled to the cabinet to move between an opened position permitting access to the interior region of the cabinet and a closed position blocking access to the interior region of the cabinet. The lock is configured to move between a locked position blocking movement of the door from the closed position and an unlocked position permitting movement of the door from the closed position. The lock includes a threaded rod rotatably supported on the door, a threaded fastener supported by the cabinet and configured to couple with the threaded rod to couple the door to the cabinet, and a motor configured to rotate the threaded rod relative to the threaded fastener.

According to another aspect of the present invention, a lock is provided that is configured for use with a vending machine having a cabinet and a door. The lock includes a rod adapted to be supported by at least one of the cabinet and the door and a fastener adapted to be supported by at least one of the door and the cabinet. The fastener is configured to couple with the rod to couple the door to the cabinet. The lock further includes a motor configured to create rotational movement between the rod and the fastener to uncouple the rod from the fastener.

According to another aspect of the present invention, another vending machine is provided. The vending machine includes a cabinet, a door, and a lock. The cabinet defines an interior region sized to receive the objects for distribution. The door is coupled to the cabinet to move between an opened position permitting access to the interior region of the cabinet and a closed position blocking access to the interior region of the cabinet. The lock is configured to move between a locked position blocking movement of the door from the closed position and an unlocked position permitting movement of the door from the closed position. The lock includes a rod rotatably supported by the door and a fastener supported by cabinet and configured to couple with the rod to couple the door to the cabinet. The rod has male threads and the fastener has female threads configured to mate with the male threads of the rod. The fastener is configured to couple with the rod without rotating the rod relative to the fastener. The fastener is configured to uncouple from the rod by rotating the rod relative to the fastener. The lock further including a spring positioned to urge the rod away from the fastener.

According to another aspect of the invention, another lock configured for use with a vending machine having a cabinet and a door is provided. The lock includes a rod adapted to be supported by at least one of the cabinet and the door and a fastener adapted to be supported by at least one of the door and the cabinet. The fastener is configured to couple with the rod to couple the door to the cabinet. The lock further includes a biaser positioned to urge the rod away from the fastener.

According to another aspect of the invention, another vending machine is provided. The vending machine includes a cabinet, a door, and a lock. The cabinet defines an interior region sized to receive the objects for distribution. The door is coupled to the cabinet to move between an opened position permitting access to the interior region of the cabinet and a closed position blocking access to the interior region of the cabinet. The lock includes a lock member, an electric lock member mover, and a mechanical lock member mover. The lock member is configured to move between a locked position blocking movement of the door from the closed position and an unlocked position permitting movement of the door from the closed position. The electric lock member mover is configured to move the lock member to the unlocked position. The mechanical lock member mover is configured to move the lock member to the unlocked position.

According to another aspect of the invention, another lock is provided. The lock is configured for use with a vending machine having a cabinet and a door. The lock includes a lock member, a first lock member mover, and a second lock member mover. The lock member is adapted to move between a locked position blocking movement of the door from the cabinet and unlocked position permitting movement of the door from the cabinet. The first lock member mover is configured to move the lock member from the locked position. The second lock member mover is configured to move the lock member from the locked position.

Additional features of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
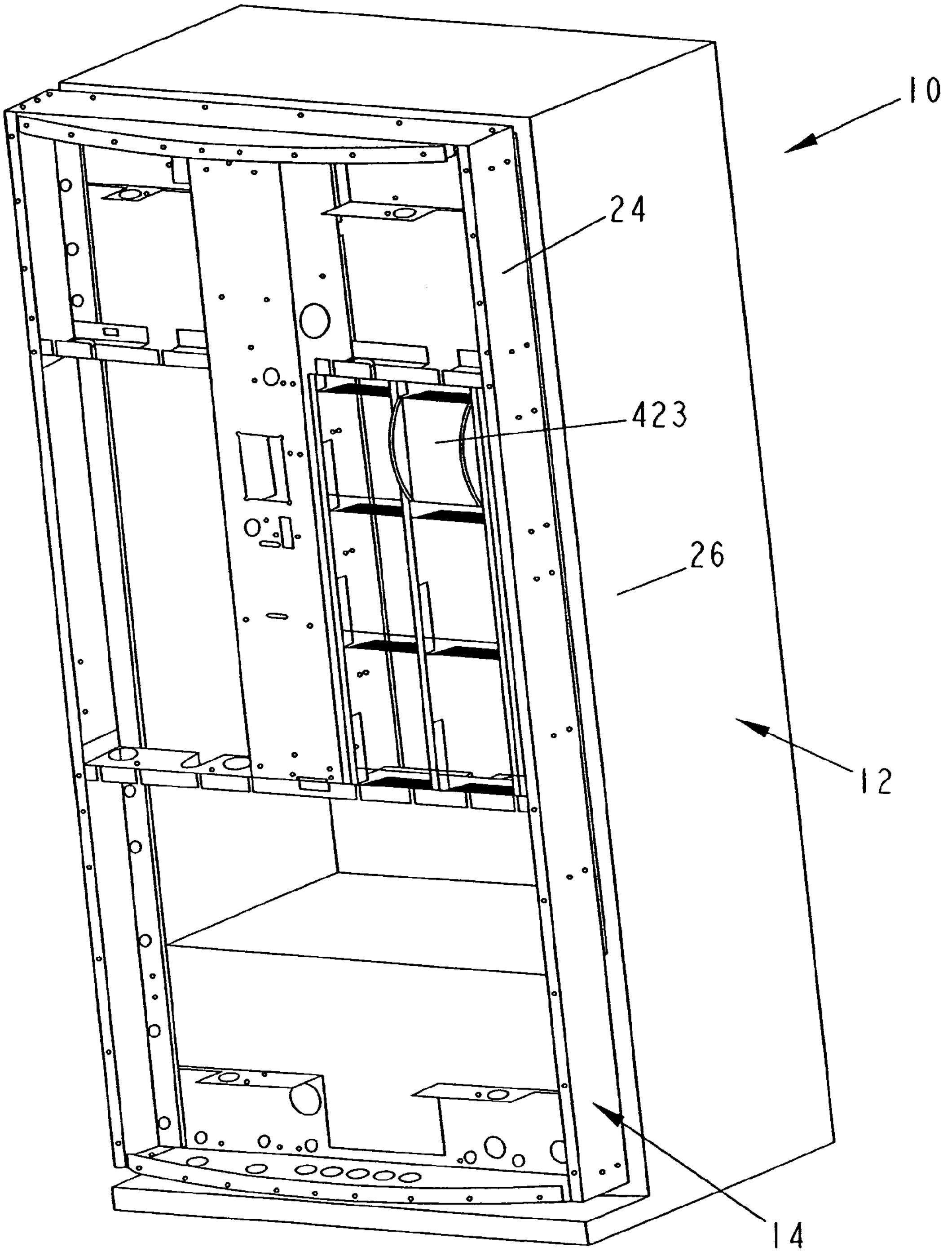
FIG. 1 is a perspective view of a vending machine having its front cover removed.
Figure 2:
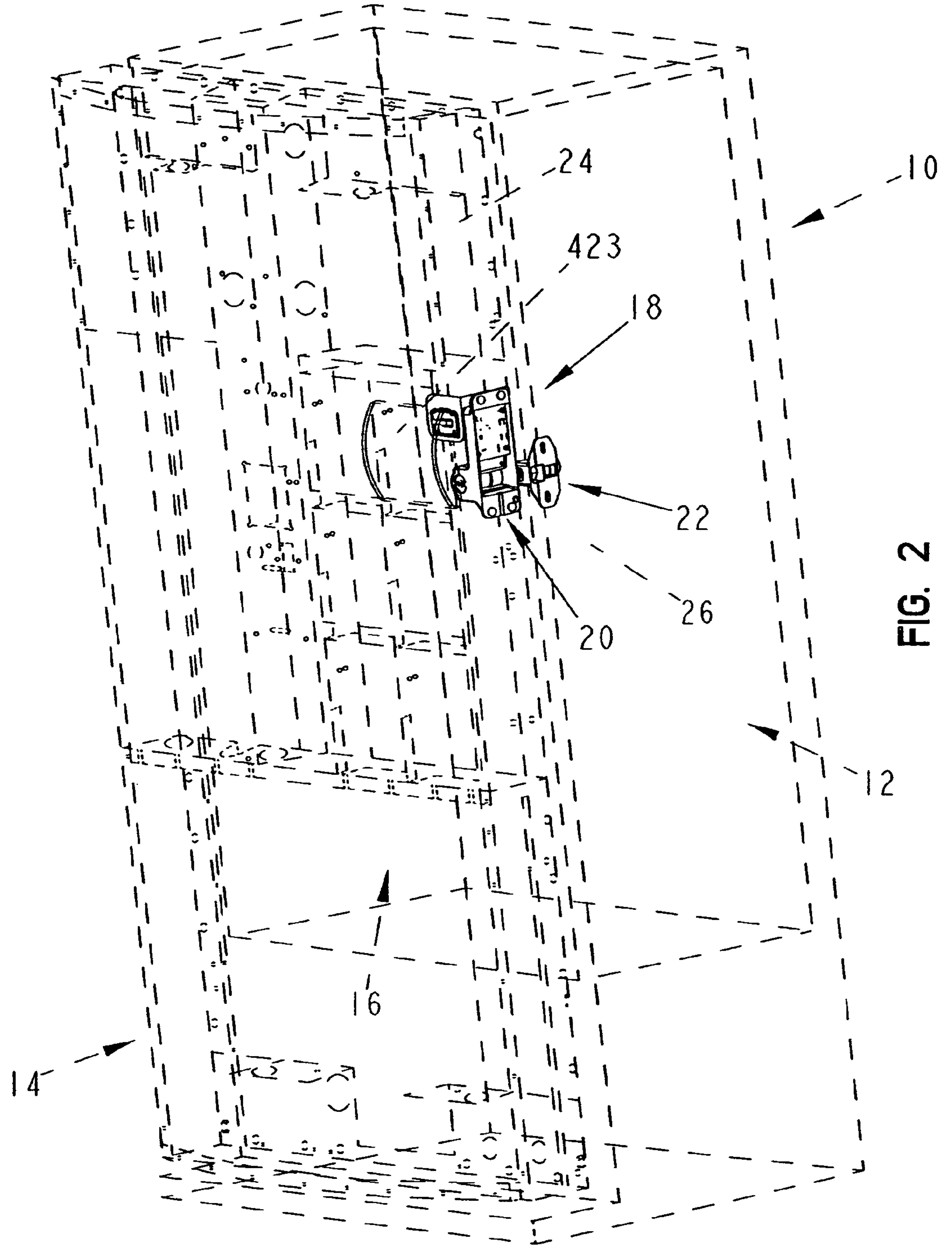
FIG. 2 is a perspective view of the vending machine (shown mostly in phantom) of FIG. 1 showing a first embodiment of a lock having first and second portions (show in solid) mounted to a door and cabinet of the vending machine.

A vending machine 10 is shown in FIGS. 1–2. Vending machine 10 includes a housing or cabinet 12 and a closure or door 14 that opens and closes relative to cabinet 12. Cabinet 12 and door 14 define a chamber or interior region 16 in which items such as beverages and food may be stored. A seal (not shown) is compressed between cabinet 12 and/or door 14 to seal vending machine 10 when door 14 is closed relative to cabinet 12. Many of the items stored in vending machine 10 must be refrigerated and the seal assists in maintaining the refrigerated state of vending machine 10.

Figure 3:
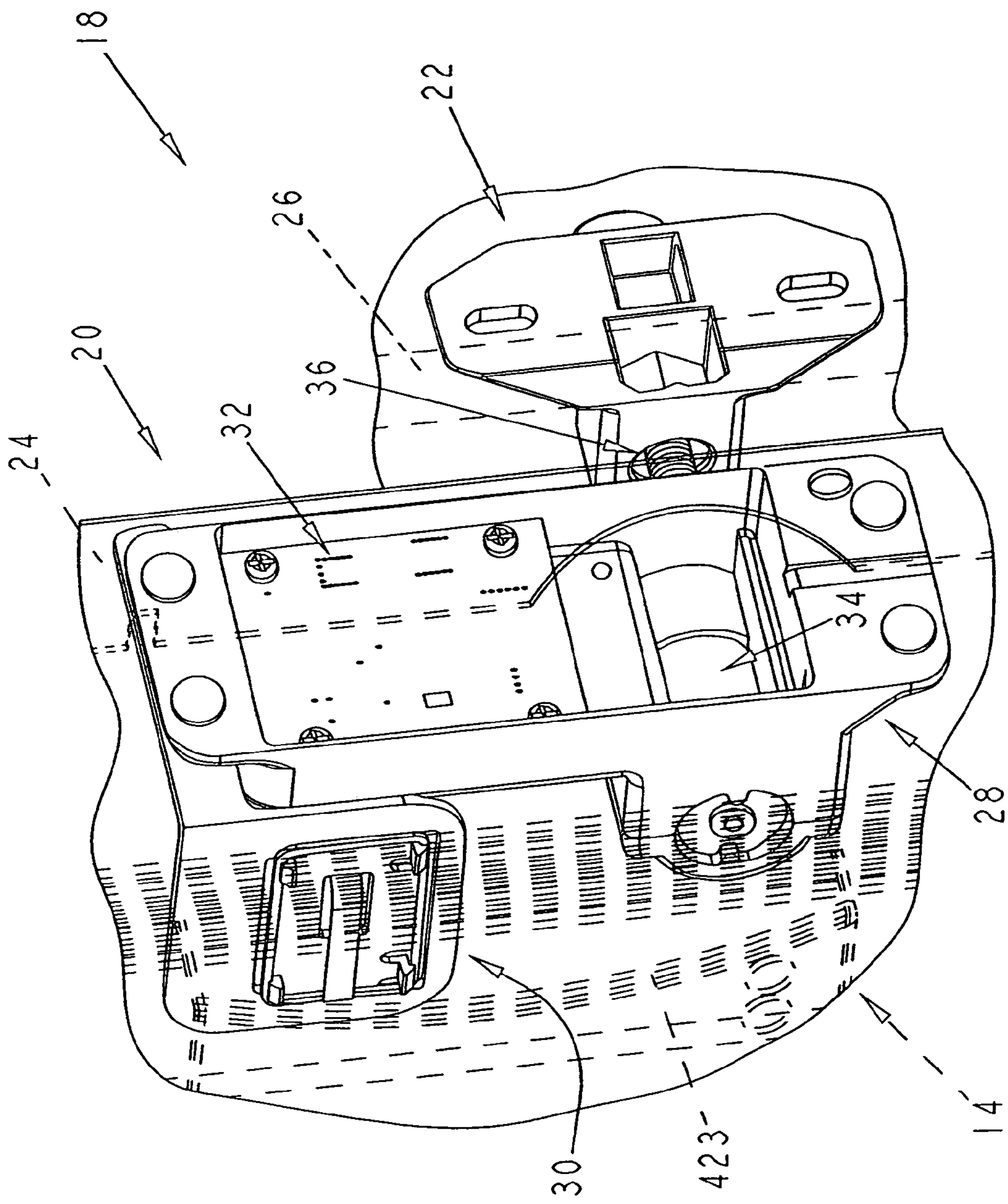
FIG. 3 is a detailed perspective view of FIG. 2 showing the first and second portions of the lock being mounted to the door and cabinet.

A lock 18 is provided that blocks movement of door 14 from a closed position to an opened position. Lock 18 includes first and second portions 20, 22 that are coupled to door 14 and cabinet 12, respectively, as shown in FIGS. 2 and 3. Door 14 includes a front cover or shroud (not shown) and a perimeter sidewall 24. As shown in FIGS. 2 and 3, first portion 20 of lock 18 is coupled to perimeter sidewall 24 of door 14. Cabinet 12 includes sidewalls 26 and second portion 22 of lock 18 is coupled to one of sidewalls 26 as shown in FIG. 2. According to alternative embodiments of the present disclosure, the first portion is coupled to the cabinet and the second portion is coupled to the door.

First and second portions 20, 22 of lock 18 are positioned relative to door 14 and cabinet 12, respectively, so that first and second portions 20, 22 can interact with each other to secure and seal door 14 to cabinet 12. In addition, first and second portions 20, 22 of lock 18 are coupled to vending machine 10 so that entire lock 18 is positioned within interior region 16 of vending machine 10. In FIG. 1, the front cover of door 14 is removed to expose interior region 16 of vending machine 10. When the front cover is present, no portion of lock 18 is visible to an individual looking at the outside of vending machine 10.

First portion 20 of lock 18 includes a housing 28, an antenna assembly 30, controls 32, an electric lock member mover or motor 34, and a lock member or threaded rod 36 as shown in FIGS. 6–9. Housing 28 is a mount that supports motor 34 and rod 36 on door 14 so that rod 36 is rotatably supported on door 14. Housing 28 includes a door mount portion 38 adapted to couple to door 14 and a motor support portion 40 configured to couple motor 34 to door mount portion 38.

Door mount portion 38 includes a face 42, sidewalls 44 coupled to the perimeter of face 42, and coupler portions 46 coupled to sidewalls 44. Face 42 of door mount portion 38 is formed to include the following portions that receive and couple to other components of first portion 20 of lock 18: an antenna assembly coupler 48, a control coupler aperture 50, a user feedback aperture 52, a user input aperture 54, and a motor coupler 56.

Face 42 and sidewalls 44 of housing door mount portion 38 of housing 28 define a chamber 58 in which controls 32 are positioned. Controls 32 are protected from unauthorized access by face 42 and sidewalls 44 of housing 28 and perimeter sidewall 24 of door 14 to which housing 28 is coupled.

Figure 6:
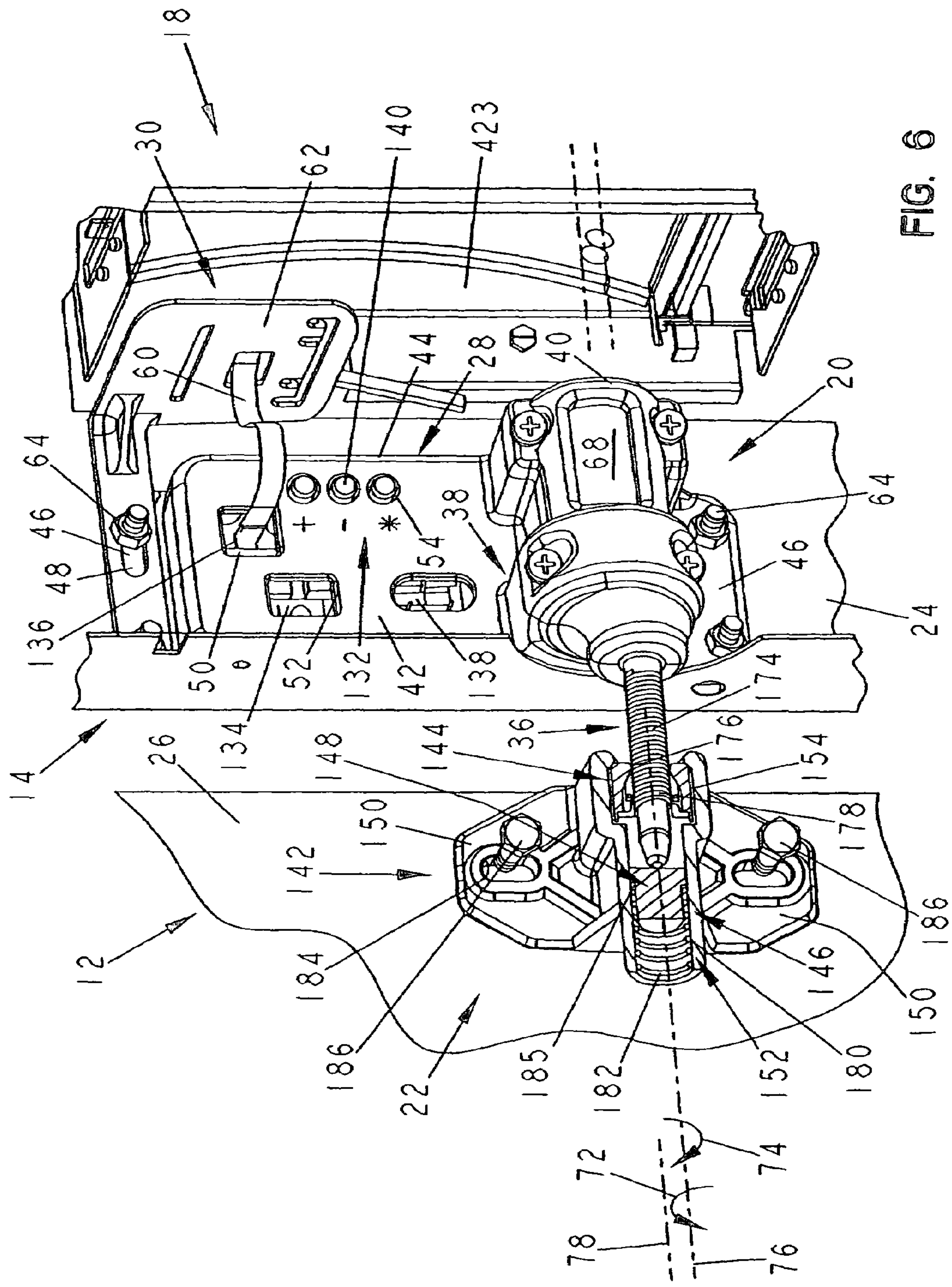
FIG. 6 is another perspective view of the first embodiment of the first portion and second portion, with portions cut away.

Antenna assembly 30 includes an antenna 60 and an antenna support 62. Antenna 60 is coupled to antenna support 62 and, in turn, antenna support 62 is coupled to antenna assembly coupler 48 of housing 28 as shown in FIG. 6. Bolts or couplers 64 couple antenna support 62 to antenna assembly coupler 48 and coupler portions 46 of housing 28 to door 14 of vending machine 10. Antenna 60 is coupled to controls 32 to provide an input to controls 32 when a user presents a proximity card, token, or other remote key (not shown) in the vicinity of antenna 60. The interaction between the remote key, antenna 60, and controls 32 is conventional proximity detection or radio frequency identification technology.

Figure 7:
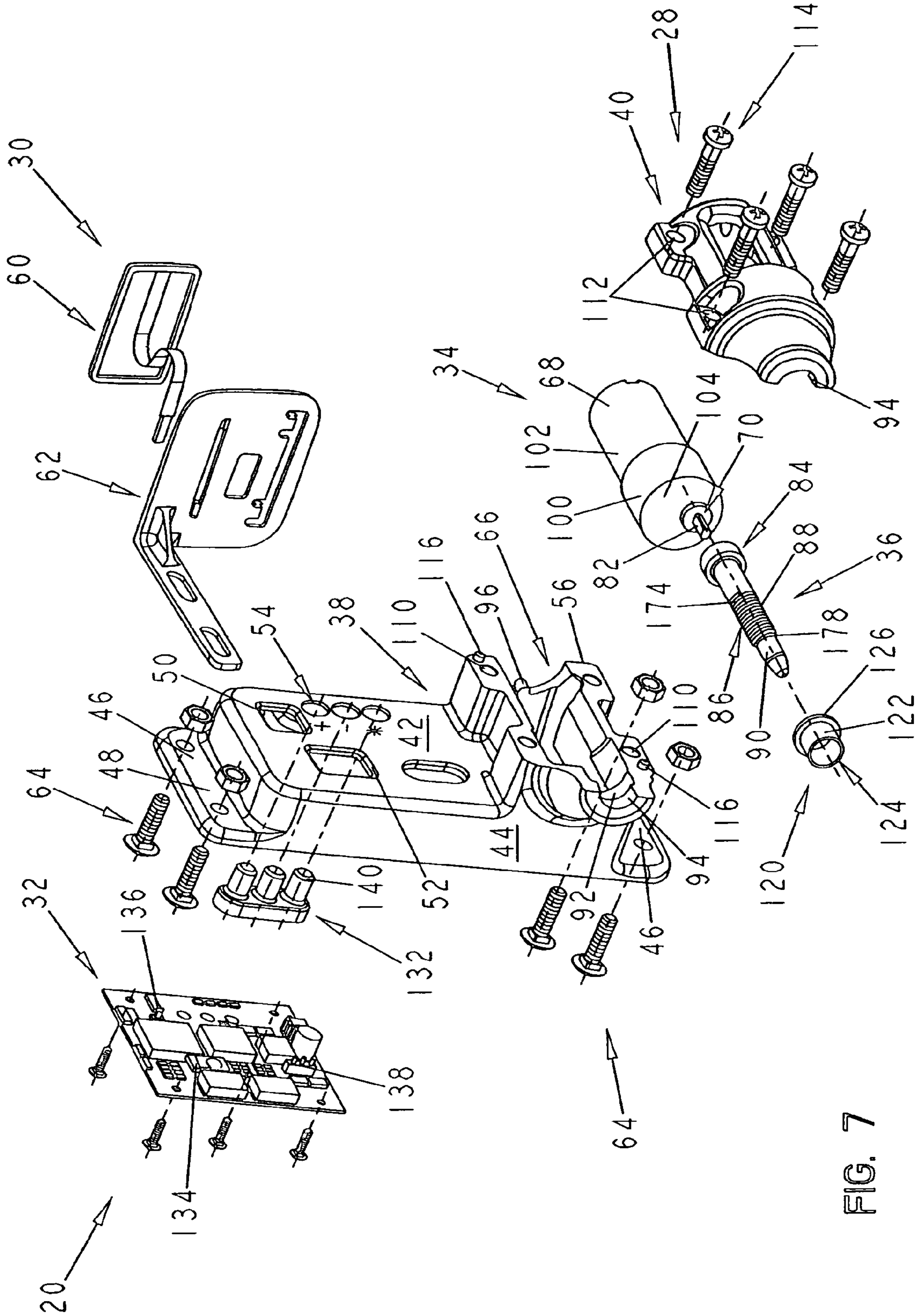
FIG. 7 is an exploded, perspective view of the first embodiment of the first portion of the lock.

Motor 34 is positioned in an interior region 66 defined between motor coupler 56 of housing 28 and motor support portion 40 as shown, for example, in FIG. 7. Motor 34 includes an outer housing 68, a gear head (not shown) and an output shaft 70. As shown in FIG. 6, output shaft 70 transfers the output of motor 34 to rod 36 and rotates in one of two directions 72, 74 about an axis 76. Motor 34 includes an axis 78 that is spaced apart from and parallel to axis 76 of output shaft 70.

Rod 36 is coupled to and collinear with output shaft 70 of motor 34 so that motor 34 is able to rotate rod 36 in directions 72, 74 about axis 76. Rod 36 includes an aperture (not shown) that receives output shaft 70 of motor 34. In the illustrated embodiment, output shaft 70 includes a D-shaped portion 82 that slides into a D-shaped aperture in rod 36. In alternative embodiments, the aperture in the bolt is not D-shaped and a set screw (not shown) is used to couple the output shaft of the motor to the bolt. As shown in FIG. 7, rod 36 includes a head 84 and a shaft 86 having a first threaded portion or interactive member 88 and a second unthreaded portion 90.

As shown in FIG. 7, head 84 of rod 36 is positioned adjacent to motor 34 between motor coupler 56 and motor support portion 40. Motor coupler 56 and motor support portion 40 each include a recess 92 that is sized and shaped to receive head 84 of rod 36 and a recess 94 that is sized and shaped to receive a portion of shaft 86 of rod 36 as shown in FIG. 7.

Motor coupler 56 of housing 28 includes a key or lug 96 that is positioned in a slot or lug-receiving notch 98 of outer housing 68 of motor 34. Lug 96 and lug-receiving notch 98 cooperate to limit the counter-rotation of motor 34 when motor 34 is rotating rod 36. Offset axes 76, 78 of motor 34 and output shaft 70 of motor 34, respectively, also assist in limiting counter-rotation of motor 34.

In one embodiment, the lug is included on the motor support portion of the housing. In another embodiment, the lug is included on the housing of the motor and either the motor coupler and/or the motor support portion includes a lug-receiving notch to accept the lug. In alternative embodiments, to limit the counter rotation of the motor, a portion of the outer shape of the housing is faceted and the motor coupler and the motor support have a corresponding faceted portion located to coincide with the faceted portion of the motor when the motor is secured by the motor coupler and the motor support.

Motor 34 is a Motor-Pittman Model #GM8212 motor having a 187:1 gear ratio. Outer housing 68 of motor 34 includes a first portion 100 having a first radial extent and a second portion 102 having a second radial extent which is smaller than the radial extent of first portion 100. First portion 100 includes a face 104 which is used to locate motor 34 in motor coupler 56 and motor support portion 40. Face 104 abuts against a stop surface 106 in motor coupler 56 and motor support portion 40. Second portion 102 includes receiving notch 98 which accepts lug 96.

Figure 8:
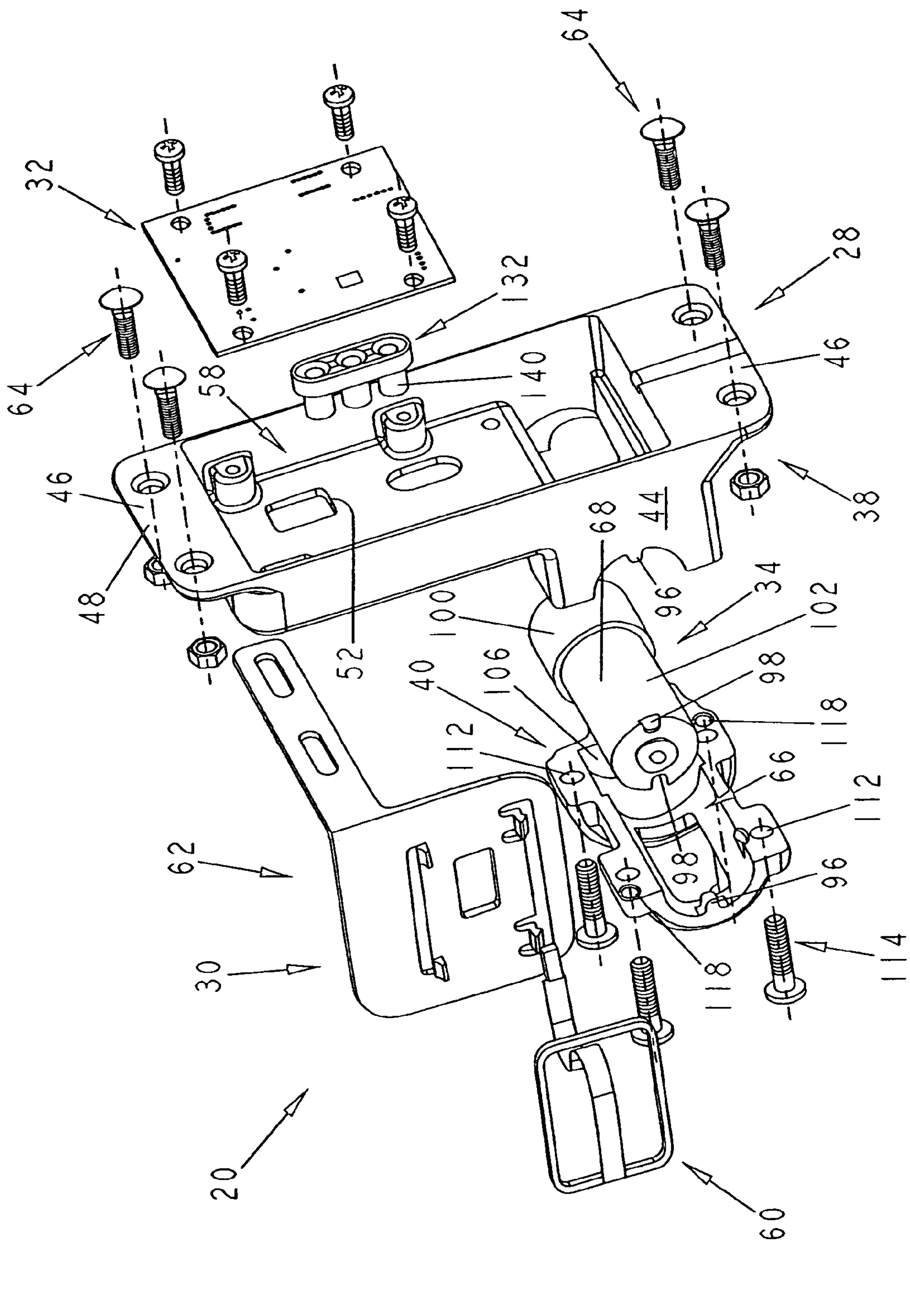
FIG. 8 is another exploded, perspective view of the first embodiment of the first portion of the lock.

Motor coupler 56 of door mount portion 38 of housing 28 and motor support portion 40 include apertures 110, 112, respectively, that align with each other and receive couplers or bolts 114. Bolts 114 extend through apertures 110, 112 and couple motor support portion 40 to door mount portion 38 of housing 28. To assist in aligning motor support portion 40 and door mount portion 38, motor coupler 56 includes projections 116 and motor support portion 40 includes apertures 118 that receive projections 116 as shown in FIGS. 7 and 8.

Interposed between rod 36 and motor coupler 56 and motor support portion 40 is sleeve 120. Sleeve 120 includes a body portion 122 having an axial opening 124 therethrough and a flange 126.

Head 84 of rod 36 is positioned adjacent to flange 126 of sleeve 120, such that shaft 86 of rod 36 is received within the opening of body portion 122 of sleeve 120. Motor coupler 56 and motor support portion 40 each include recess 92 that is sized and shaped to receive flange 126 of sleeve 120 and recess 94 that is sized and shaped to receive a portion of body portion 122 of sleeve 120. Sleeve 120 is made of a compliant member and reduces the load exerted by bolt 134 on motor housing 56 and motor support portion 40 of lock 218. In a preferred embodiment, sleeve 120 is a nylon or Teflon bearing and sleeve 120 acts as a thrust bearing.

Controls 32 include user management inputs 132, user feedback output 134, a coupling region 136 for input to controls 32, and an output 138 to control operation of motor 34. In the illustrated embodiment, user management inputs 132 include buttons 140 that permit a user to add or delete the users who are authorized to open door 14 of vending machine 10 to obtain access to interior region 16 of vending machine 10. As shown in FIG. 8, inputs 132 include separate buttons 140 for input, delete, and select. User input apertures 54 of housing 28 are sized so that a user's finger touching the buttons also abuts metal housing 28 to dissipate any static electricity.

Figure 4:
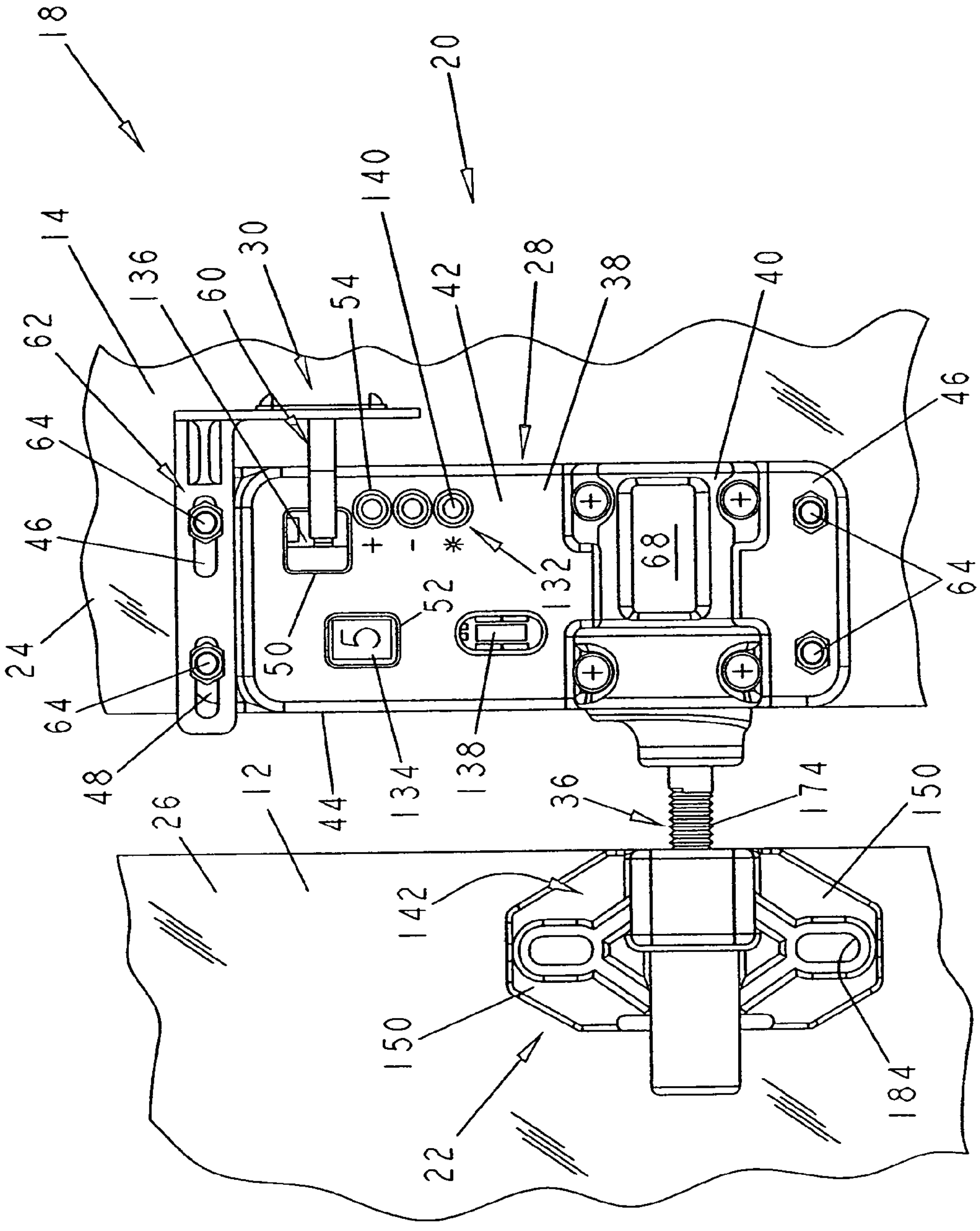
FIG. 4 is an elevational view of the first embodiment of the first and second portions of the lock coupled together.
Figure 5:
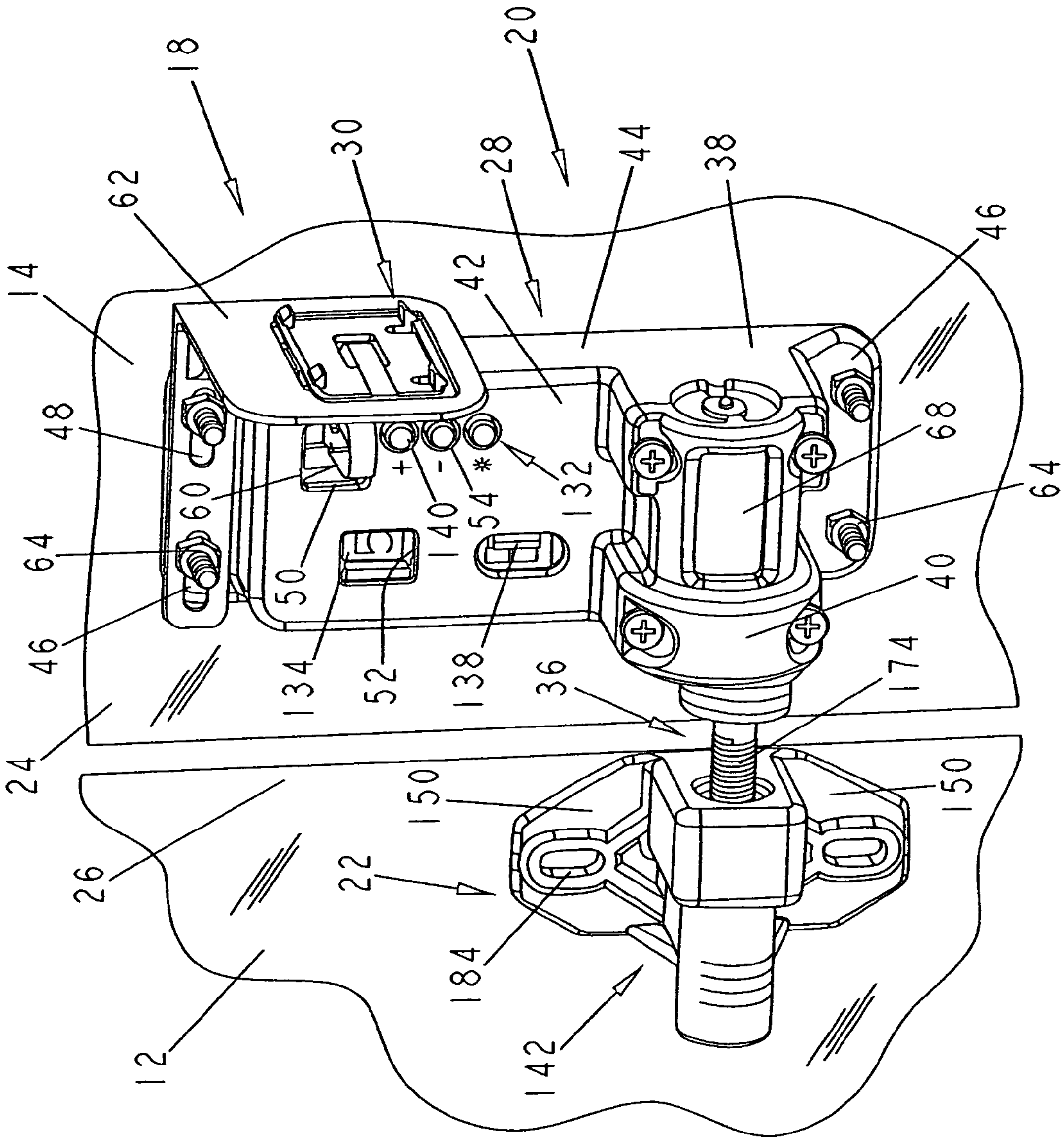
FIG. 5 is a perspective view of the first embodiment of the first and second portions of the lock.

In the illustrated embodiment, user feedback output 134 is an LED indicator as shown in FIG. 4. In alternative embodiments, the user feedback output may be any type of visual and/or audio communication. User feedback aperture 52 is sized, positioned, and shaped so that a user may see user feedback output 134 of controls 32.

Controls 32 store the information received from the user, compare it to a signal received through antenna 60, and determine if the token is authorized access to interior region 16 of vending machine 10. Additional description of a suitable authentication process is provided in U.S. Provisional Patent Application Serial No. unknown, filed November XX, 2001, titled Software for Vending Machine Lock, to Long, the disclosure of which is expressly incorporated by reference herein.

Coupling region 136 provides multiple ports to receive inputs from antenna 60, a main and auxiliary power supply, and a door position detection device (not shown). In alternative embodiments, the coupling region may include ports for other functions including, for example, a handheld device through which a user could add or delete authorized users or collect information about usage of lock 18.

Figure 10:
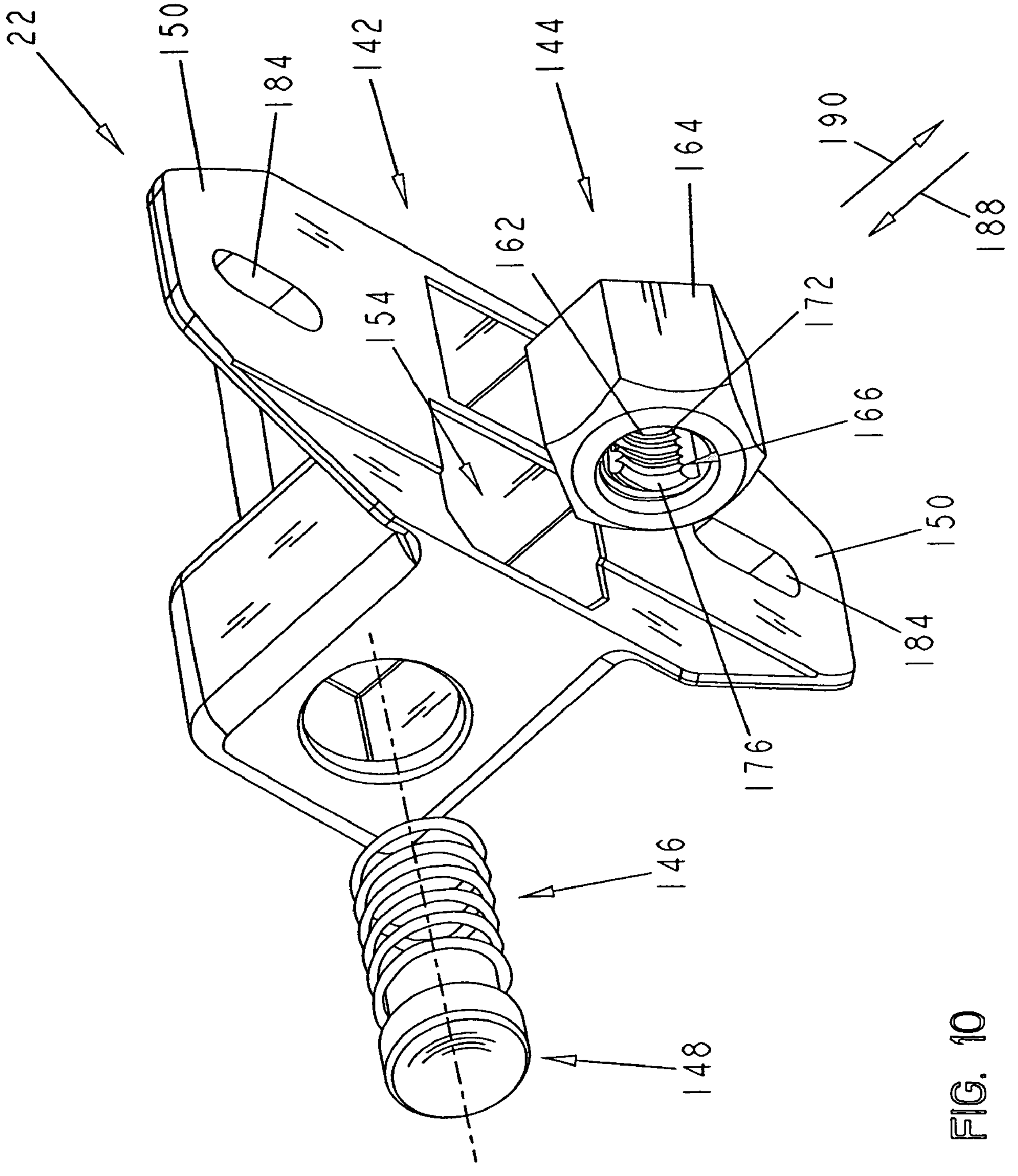
FIG. 10 is an exploded perspective view of the first embodiment of the second portion of the lock.

Second portion 22 of lock 18 includes a housing or mount 142, a coupler or fastener 144, a compression spring or biaser 146, a strike member or plunger 148, and a door position detection device (not shown) as shown in FIG. 10. Housing 142 includes coupling portions 150 and first and second apertures 152, 154 that receive fastener 144, compression spring 146, plunger 148.

Figure 13:
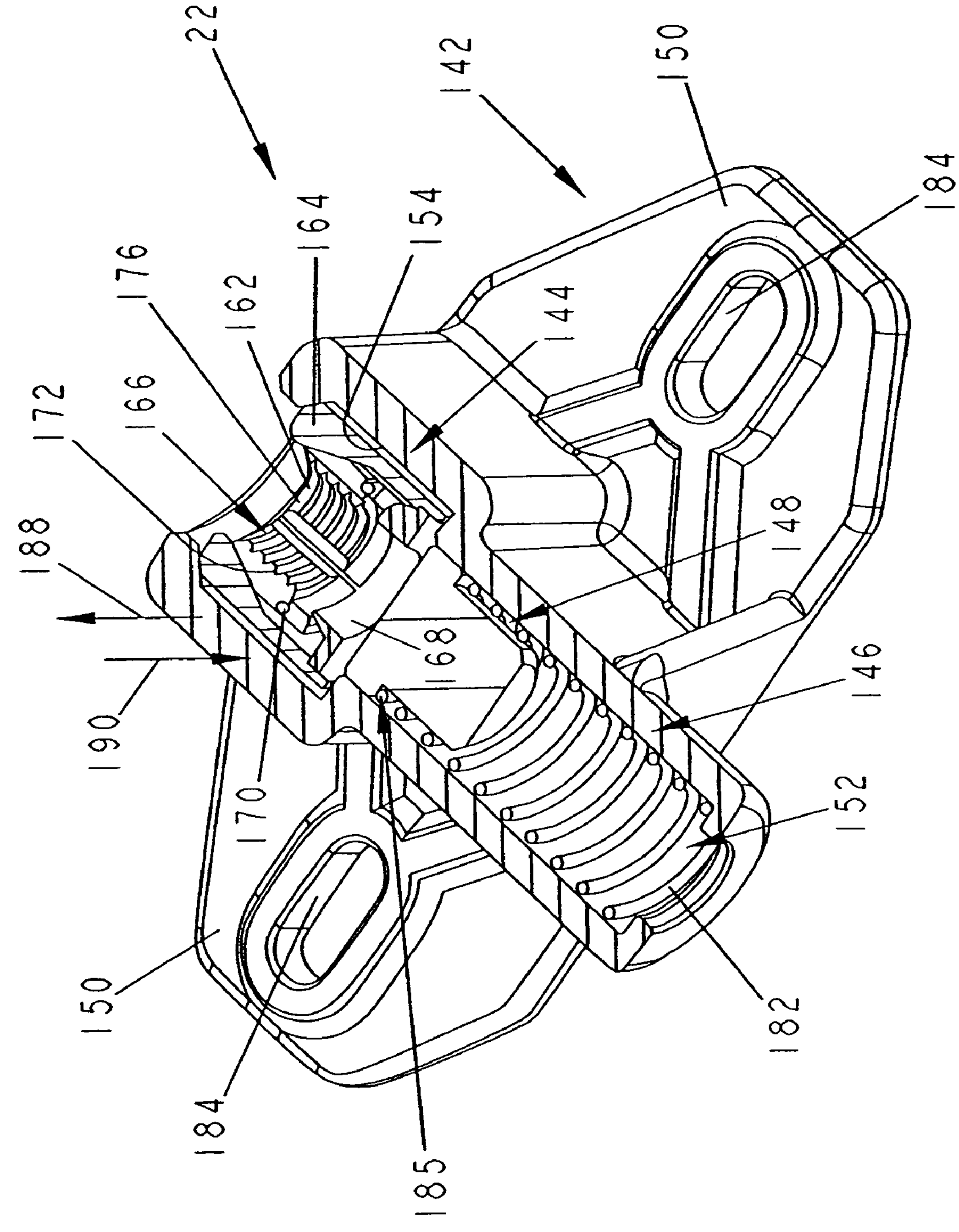
FIG. 13 is a sectional view of the second portion of the lock of the first embodiment.

Plunger 148 is supported by and coupled to spring 146, as shown in FIGS. 6 and 13, and plunger 148 and spring 146 are positioned in first aperture 152. Fastener 144 is positioned in second aperture 154 and held in place due to the force exerted by spring 146 and plunger 148 on fastener 144 as shown in FIG. 13.

In the illustrated embodiment, fastener 144 is the Zip-Nut®. sold by Thread Technology, Inc., 7700 Leesburg Pike, Suite 301, Falls Church, Va. 22043 USA and covered by U.S. Pat. Nos. 4,378,187; 5,324,150; 5,427,488; 5,378,100; 5,580,200; 5,613,816; 5,733,084; 5,788,443 which are incorporated by reference herein. In alternative embodiments, fastener 144 may be a quick insertion sold by Honeybee Robotics, Ltd. of 204 Elizabeth St. N. Y., N.Y. 10012.

In general, fastener 144 permits rod 36 to be pushed axially into housing 142 of second portion 22 of lock 18 through fastener 144 without having to thread rod 36 in, secures rod 36 after rod 36 stops moving, and permits rod 36 to be threaded out of second portion 22 of lock 18 through fastener 144. Fastener 144 includes a threaded inner surface 162 that expands as rod 36 is pushed into housing 142 and engages rod 36 when rod 36 is stationary or being unthreaded from housing 142. In alternative embodiments, devices other than fastener 144 may be used to engage rod 36.

Figure 11:
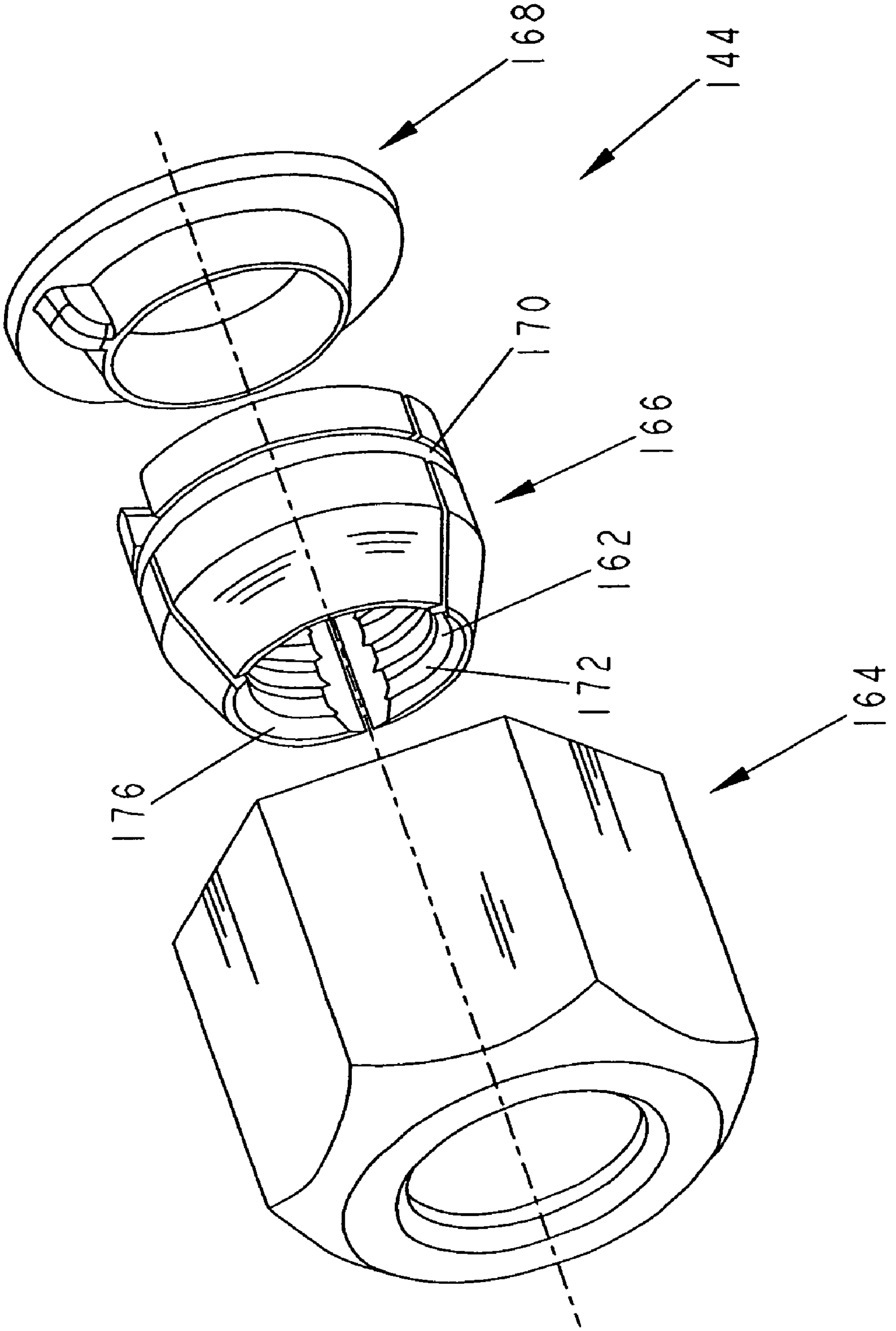
FIG. 11 is an exploded perspective view of a fastener of the second portion of the lock of the first embodiment.
Figure 12:
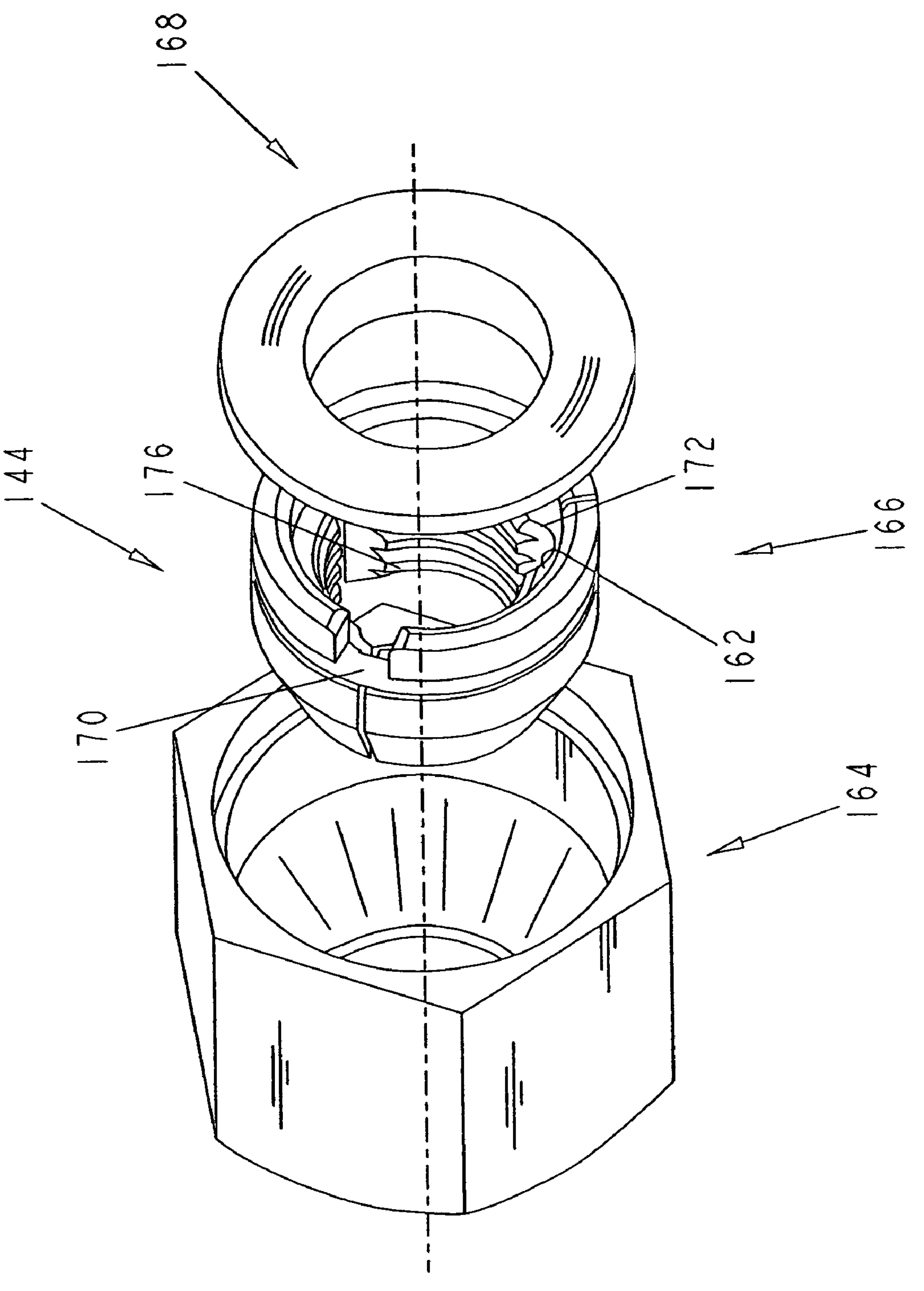
FIG. 12 is another exploded perspective view of the fastener of the second portion of the lock of the first embodiment.

Preferred threaded fastener 144 is an expansion nut that includes a base 164, a plurality of thread segments or second interactive members 166 positioned in base, an end cap 168, and a spring 170 as shown in FIGS. 11 and 12. When rod 36 is inserted into fastener 144, thread segments 166 a pushed radially outward against the bias of spring 170. After rod 36 is in position, spring 170 pushes thread segments 166 back in so that female threads 172 defined by thread segments 166 mate with male threads 174 of rod 36.

As shown in FIG. 6, female and male threads 172, 174 have end threads 176, 178 that are the first to contact when rod 36 is inserted into fastener 144 and are the last to mate when rod 36 is turned out of fastener 144. On some occasions, rod 36 will not back out during removal unless longitudinal force is applied. This situation typically occurs when end threads 176, 178 or some portion thereof are the only threads still mated together. Spring 146 is positioned to provide such a longitudinal force to avoid this situation. Thus, spring 146 urges rod 36 away from fastener 144.

Compression spring 146 is preferably positioned between fastener 144 and housing 142 so that it is also positioned between rod 36 and housing 142. This positioning results in rod 36 being urged away from both fastener 144 and cabinet 12. According to alternative embodiments of the present disclosure, the spring is positioned in other locations resulting in the rod being urged away from the fastener and/or the cabinet. For example, according to one alternative embodiment, the spring is positioned between the rod and the fastener. According to another embodiment, the spring is positioned between the door and the cabinet to urge the rod away from the fastener and/or the cabinet.

Spring 146 includes a plurality of coils 180 that define a first end 182 that abuts housing 142 and a second end 185 that is coupled to plunger 148. According to alternative embodiments, other biaser are provided such as leaf springs, torsion springs, other springs known to those of ordinary skill in the art, resilient members, or any other device known to those of ordinary skill in the art that urges one object away or toward another.

In the illustrated embodiment, coupling portions 150 of housing 142 include slots 184. As shown in FIG. 4, bolts or couplers 186 extend through slots 184 to couple housing 142 of second portion 22 of lock 18 to cabinet 12 of vending machine 10. Slots 184 permit a range of positions in which housing 142 can be coupled to vending machine 10. Once the desired position is obtained, bolts 186 are tightened so that housing 142 is fixed to vending machine 10.

To secure and seal door 14 of vending machine 10 relative to cabinet 12 of vending machine 10, a user moves door 14 toward cabinet 12 so that rod 36 enters housing 142 of second portion 22 of lock 18. As rod 36 is pushed into housing 142, rod 36 passes through fastener 144, engages plunger 148, and compresses spring 146. Once a user stops pushing rod 36 into housing 142, the threaded inner surface of fastener 144 engages rod 36 and secures door 14. When the door position detection device determines that rod 36 is in the vicinity of second portion 22 of lock 18, the door position detection device communicates with controls 32 so that controls 32 activate motor 34 to rotate rod 36 in direction 72. Rotation of rod 36 in direction 72 threads rod 36 further into housing 142 to ensure that door 14 and cabinet 12 of vending machine 10 are properly sealed. Motor 34 stops rotating rod 36 after fifteen seconds of operation or when a predetermined torque is being exerted by motor 34.

In preferred embodiments, the door position detection device causes controls 32 to start motor 34 when rod 36 abuts or engages fastener 144. In addition, in preferred embodiments, motor 34 is delayed in rotating rod 36 in direction 72 until the door position detection device determines that rod 36 is in the vicinity of second portion 22 of lock 18 for a predetermined amount of time. In preferred embodiments, this predetermined amount of time is approximately one second.

To open door 14 of vending machine 10, a user presents a token or remote key in the vicinity of antenna 60. As discussed above, if controls 32 determine that the token is authorized access to vending machine 10, controls 32 instruct motor 34 to rotate rod 36 in direction 74. Rotation of rod 36 in direction 74 threads rod 36 out of fastener 144 and housing 142. Motor 34 stops rotating after fifteen seconds of operation or when the door position detection device determines that rod 36 is spaced apart from second portion 22 of lock 18.

Figure 9:
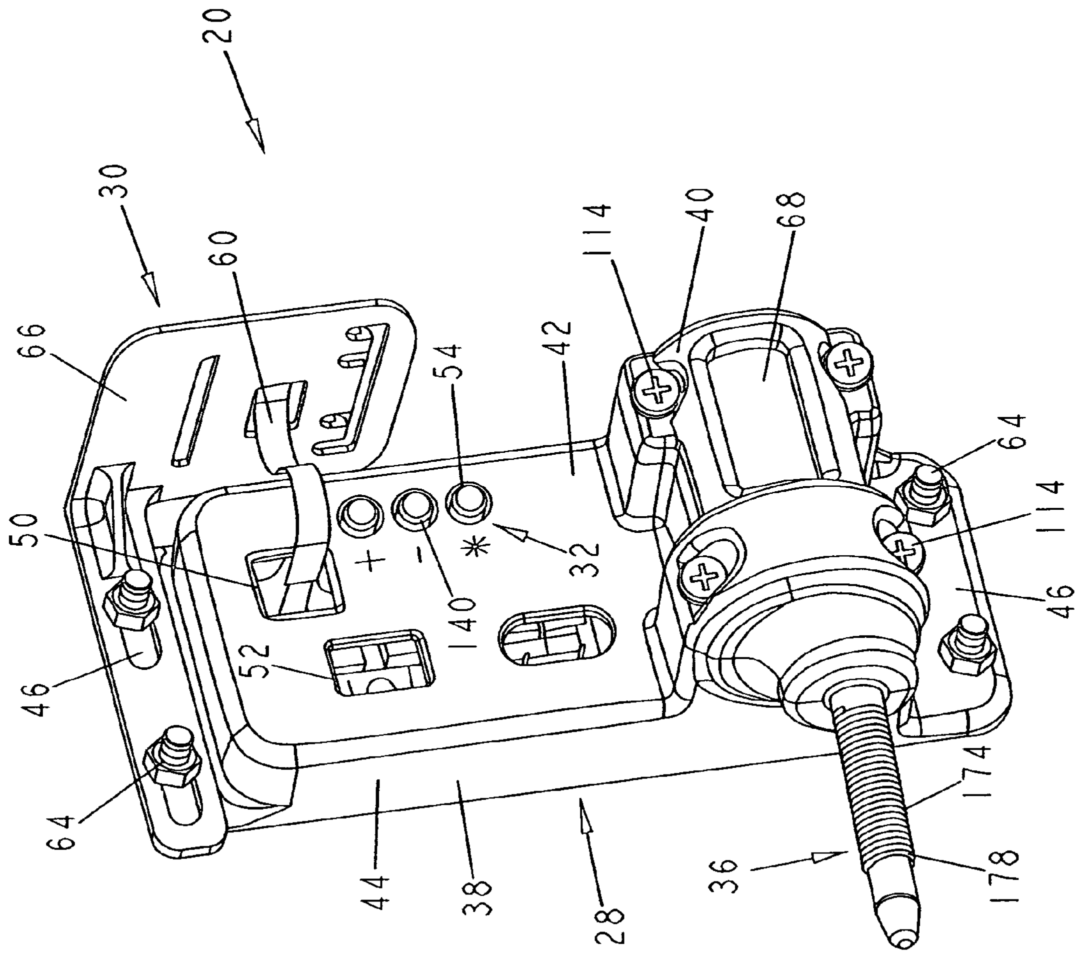
FIG. 9 is another perspective views of the first embodiment of the first portion of the lock.

Plunger 148 and compression spring 146 bias rod 36 out of housing 142 to assist motor 34 in threading rod 36 out of fastener 144 and housing 142. Unthreaded portion 90 of rod 36 has a length 132 that is greater than a length of fastener 144, as shown in FIG. 9. Length 132 of unthreaded portion 90 of rod 36 permits plunger 148 to remain in contact with rod 36 until rod 36 is disengaged from fastener 144.

To assist in closing door 14 due to misalignment conditions, fastener 144 is permitted to move in directions 188, 190 through second aperture 154 as shown in FIG. 13. The range of movement of fastener 144 is defined by housing 142 and side wall 26 of cabinet 12 which traps fastener 144 in housing 142 when mounted on side wall 26. This range of movement by fastener 144 permits rod 36 to self locate or self center on fastener 144 and permits rod 36 to pass through fastener 144 as rod 36 travels through an arcuate path as door 14 of vending machine 10 is being closed.

Figure 14:
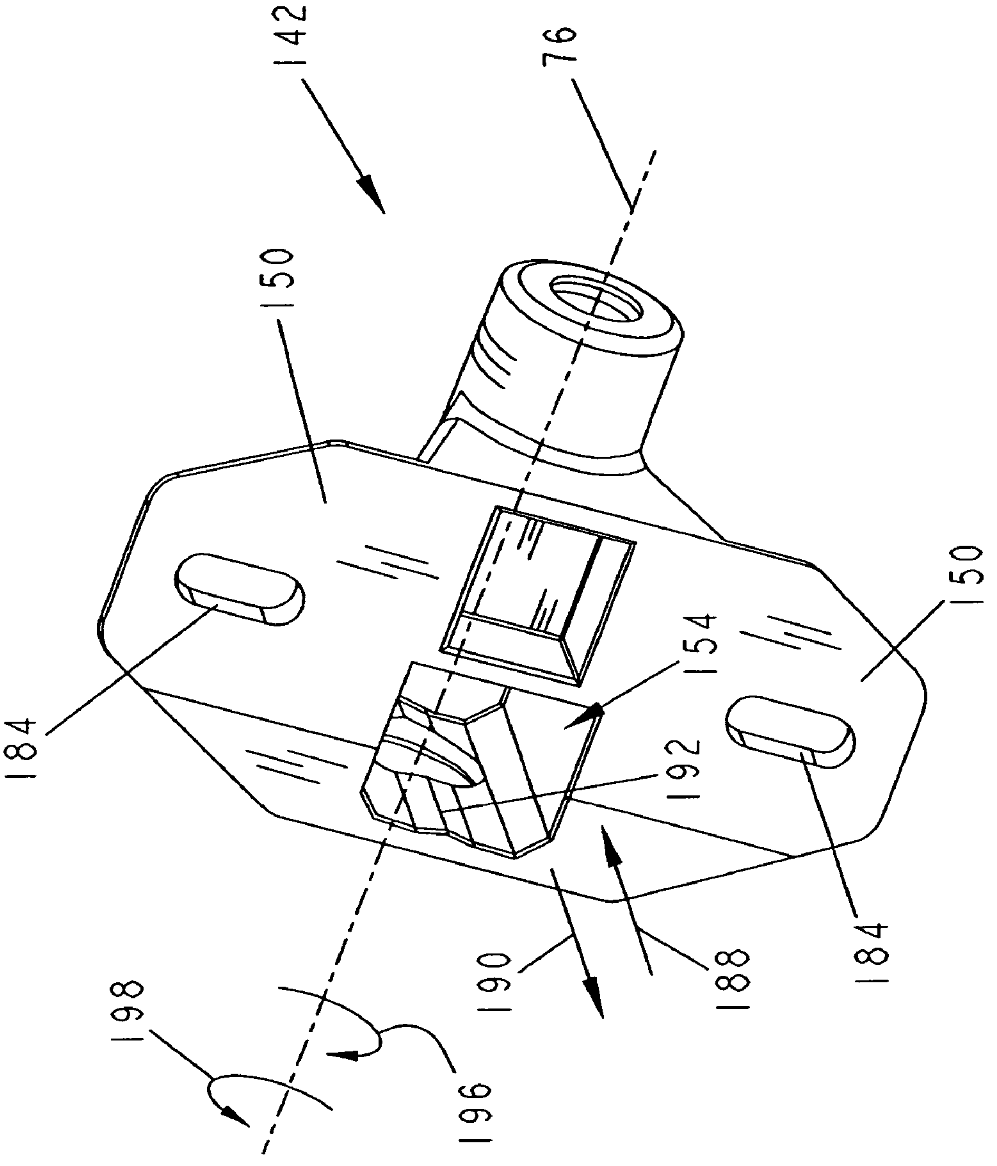
FIG. 14 is a perspective view of a housing of the second portion of the lock of the first embodiment.

Further, housing 142 includes a rib 192 located on a surface 194 within aperture 154 as shown in FIG. 14. Rib 192 is positioned along surface 194, such that it intersects axis 76, thereby generally bisecting fastener 144. Fastener 144 is capable of rocking or rotating about rib 192 in directions 196, 198. The two degrees of freedom, movement in directions 188, 190 and in directions 196, 198, of fastener 144 permits rod 36 to self locate or self center on fastener 144 and permits rod 36 to pass through fastener 144 as rod 36 travels through an arcuate path as door 14 of vending machine 10 is being closed.

In alternative embodiments, the size of the second aperture may be changed to, for example, permit fastener 144 to move in directions other than or in addition to directions 188, 190. In alternative embodiments, a stop (not shown) is provided to limit the movement of the fastener in the housing.

Figure 15:
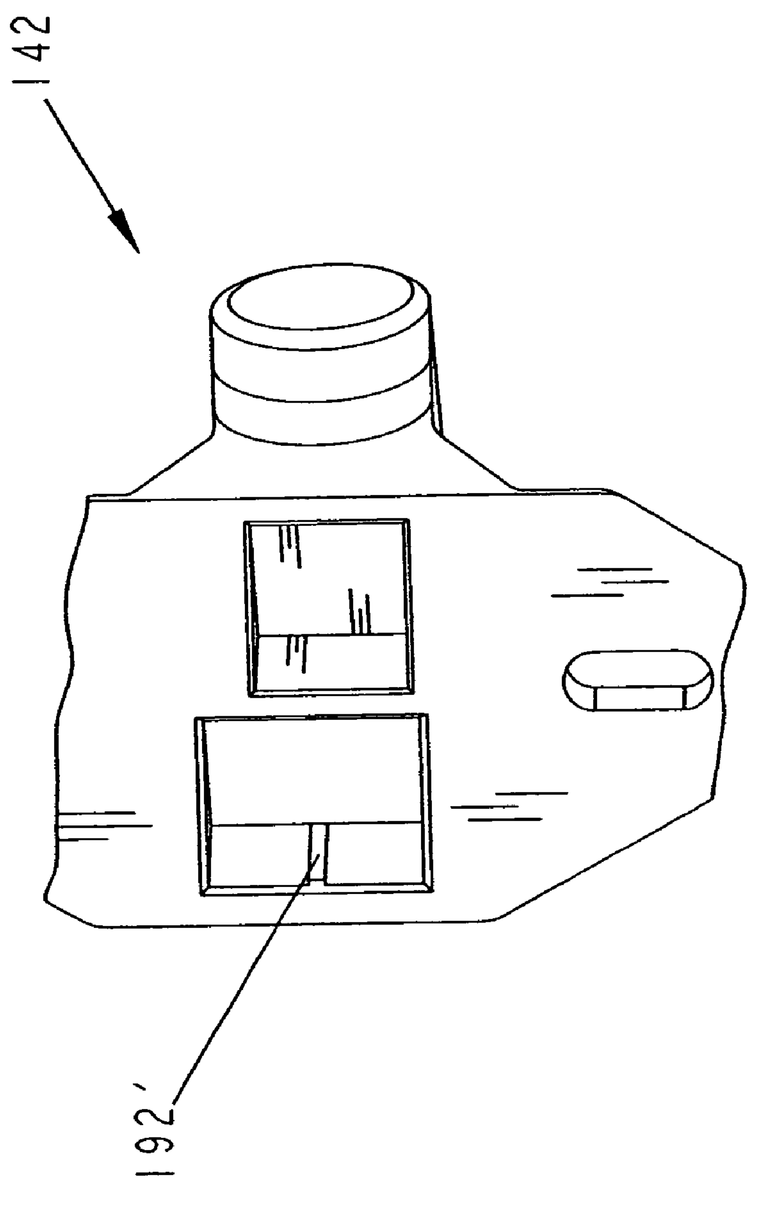
FIG. 15 is a perspective view of an alternative embodiment housing of a second portion of a lock.

An alternative embodiment housing 142' is shown in FIG. 15. Housing 142' is substantially similar to housing 142. However, includes an alternative embodiment rig 192'. In alternative embodiments, the ribs may be replaced by another types of projections.

According to alternative embodiments of the present disclosure, other shapes of fasteners are provided. For example, according to one embodiment, the perimetrical surfaces of the fastener forms a quadrilateral shape as opposed to a hexagonal shape. The quadrilateral shape of the fastener limits the rotation of the fastener within aperture 154.

When power loss to vending machine 10 occurs and power is later restored, if the bolt detection member determines that rod 36 is in the vicinity of second portion 22 of lock 18, controls 32 bump motor 34 and rotate rod 36 in direction 72 to ensure that door 14 and cabinet 12 are sealed.

A second embodiment of a lock 218 is shown in FIGS. 16–20. Lock 218 is structurally and functionally similar to lock 18. The differences between lock 218 and lock 18 are set forth below. Several components and features of lock 18 and lock 218 are generally similar. As such, the components and features which are generally similar in both lock 18 and lock 218 are identified with the reference numeral used in lock 18 embodiment and are not described in as great of detail or are not described at all in relation to lock 218. It should be understood that one or more of the components or features of the locks described herein or incorporated by reference could be provided on the other locks described herein or incorporated by reference.

Figure 19:
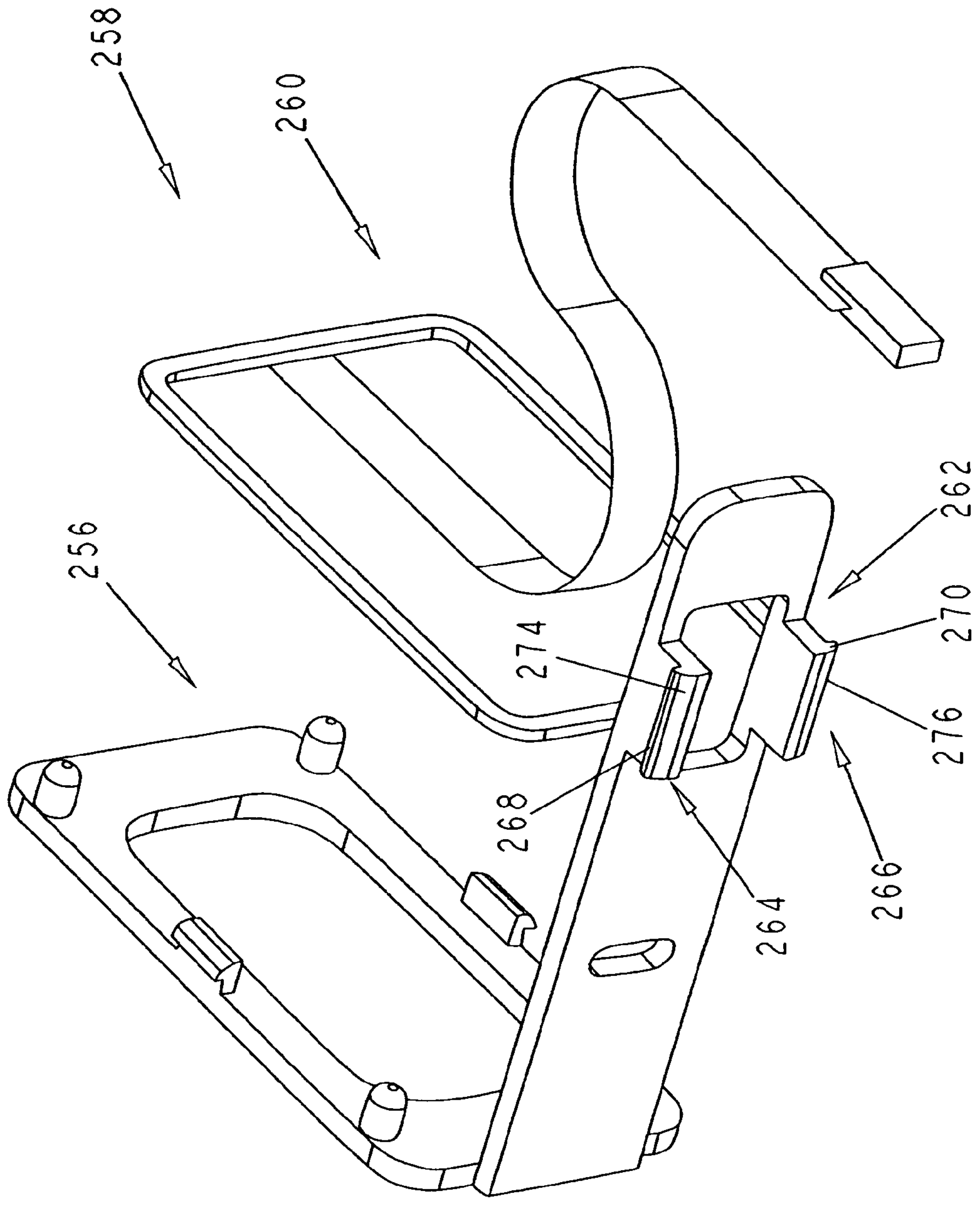
FIG. 19 is an exploded, perspective view of an antenna assembly of the second embodiment.
Figure 20:
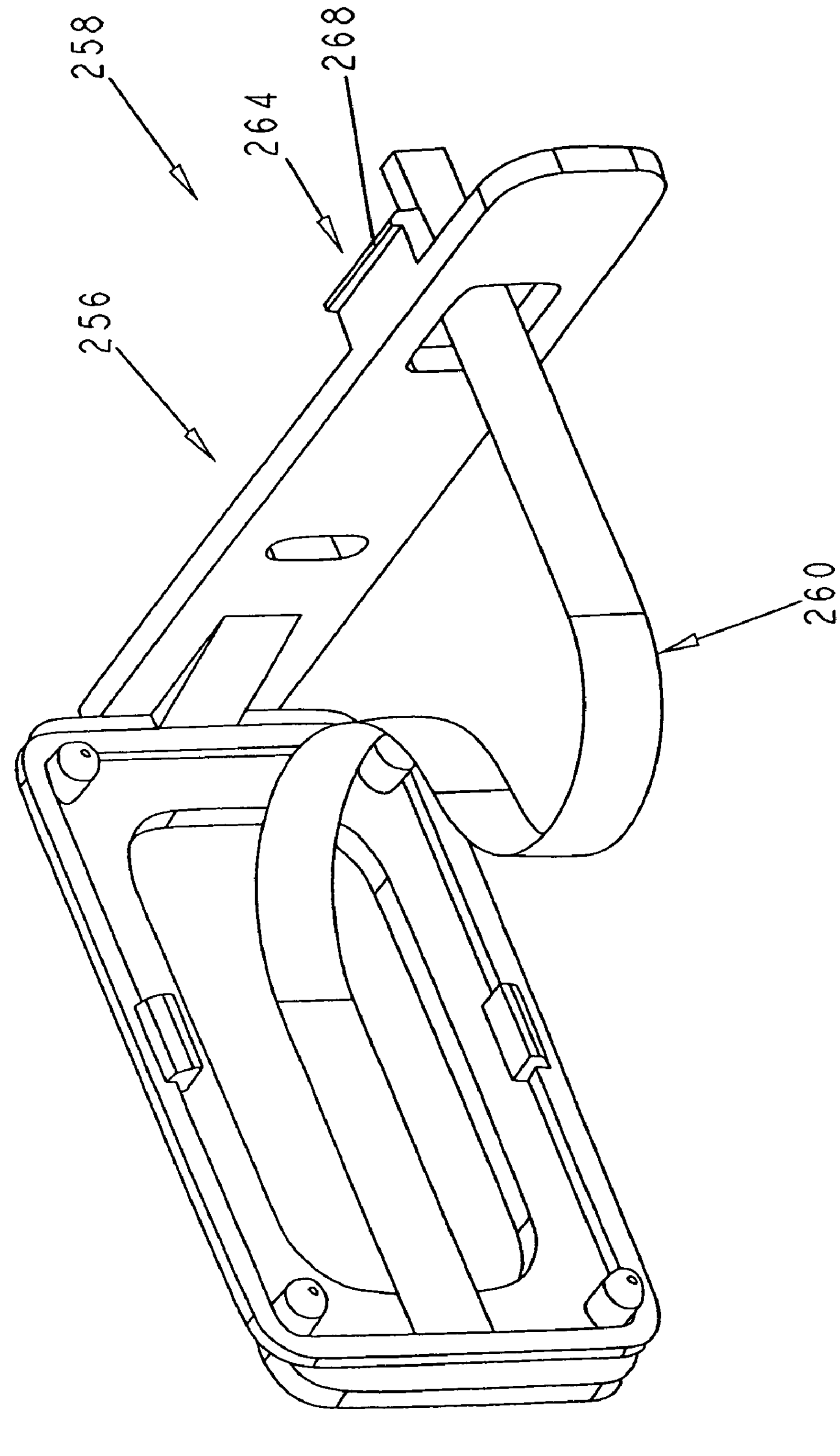
FIG. 20 is a perspective view of the antenna assembly of the second embodiment.

Lock 218 includes an antenna assembly 258 as shown in FIGS. 16–20. Referring to FIGS. 19 and 20, antenna assembly 258 includes an antenna 260 and an antenna support 256. As shown in FIG. 19, antenna support 256 includes a coupler 262 including a first arm 264 and a second arm 266. First arm 264 and second arm 266 each include catches 268, 270, respectively, that couple antenna support 256 to door mount housing 38. As shown in FIG. 12, antenna assembly coupler 144 of door mount housing 38 includes perimetrical surface 272 of control coupler aperture 50.

Figure 16:
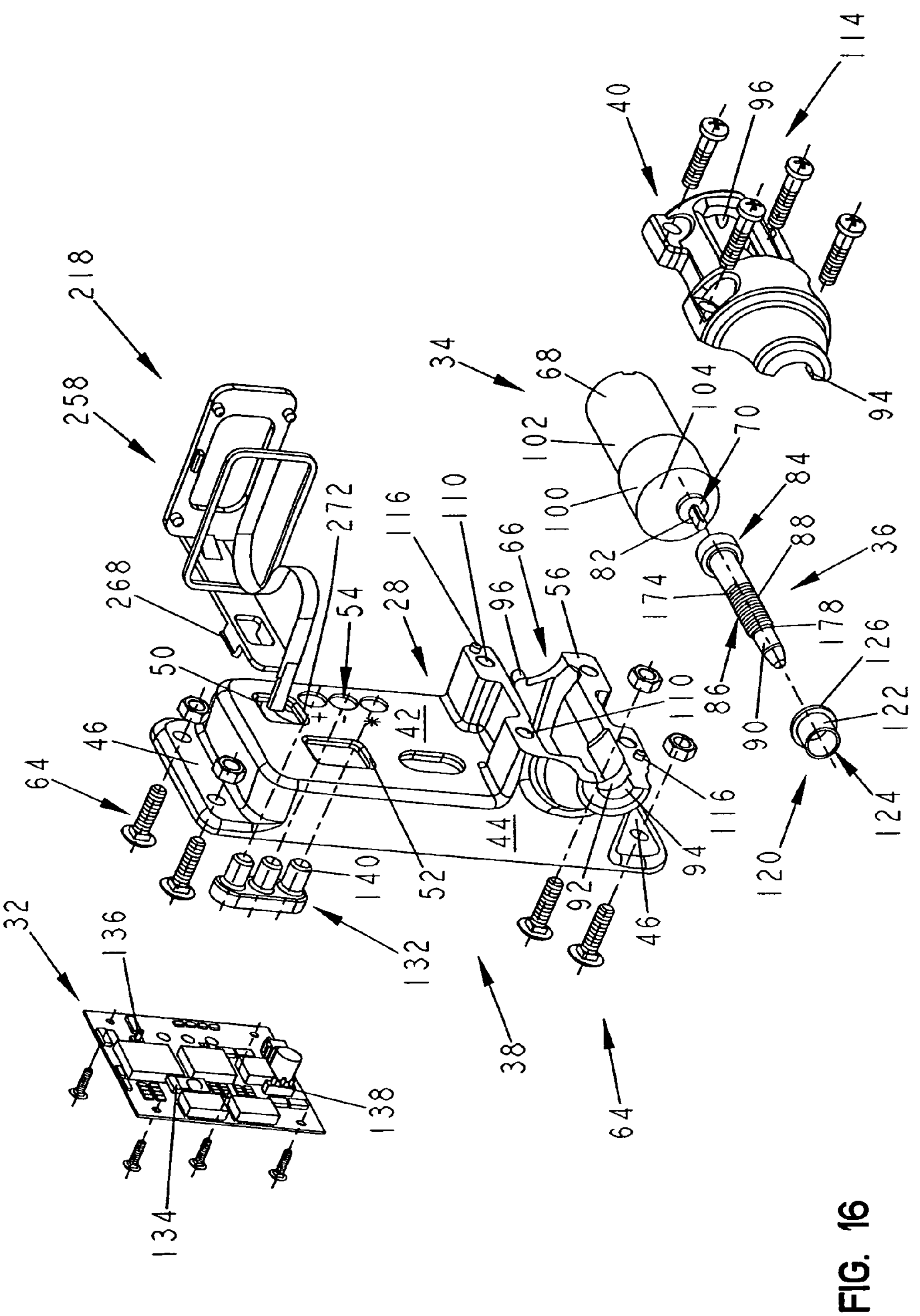
FIG. 16 is an exploded, perspective view of the first portion of a second embodiment of a lock.
Figure 17:
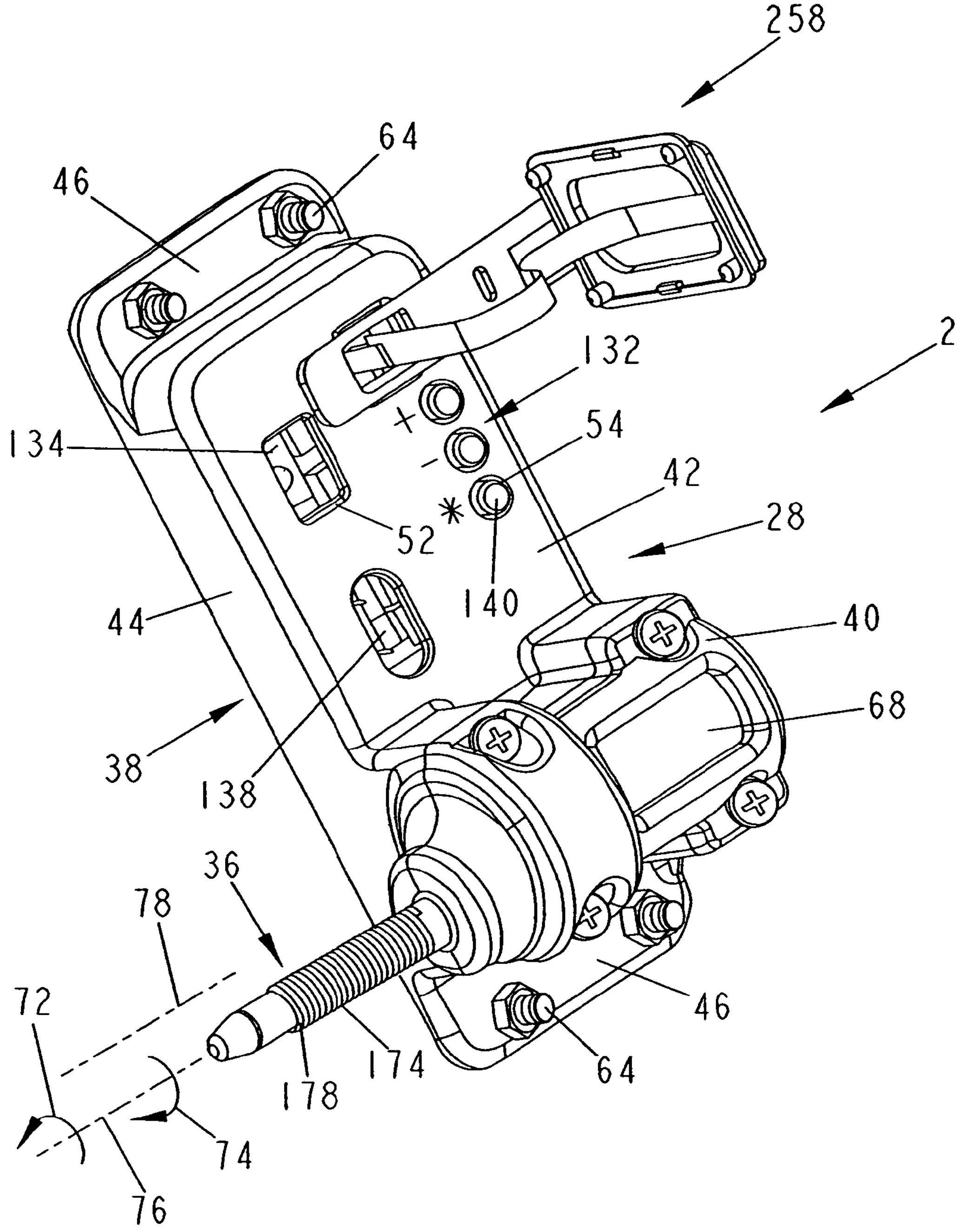
FIG. 17 is a perspective view of the first portion of the second embodiment.
Figure 18:
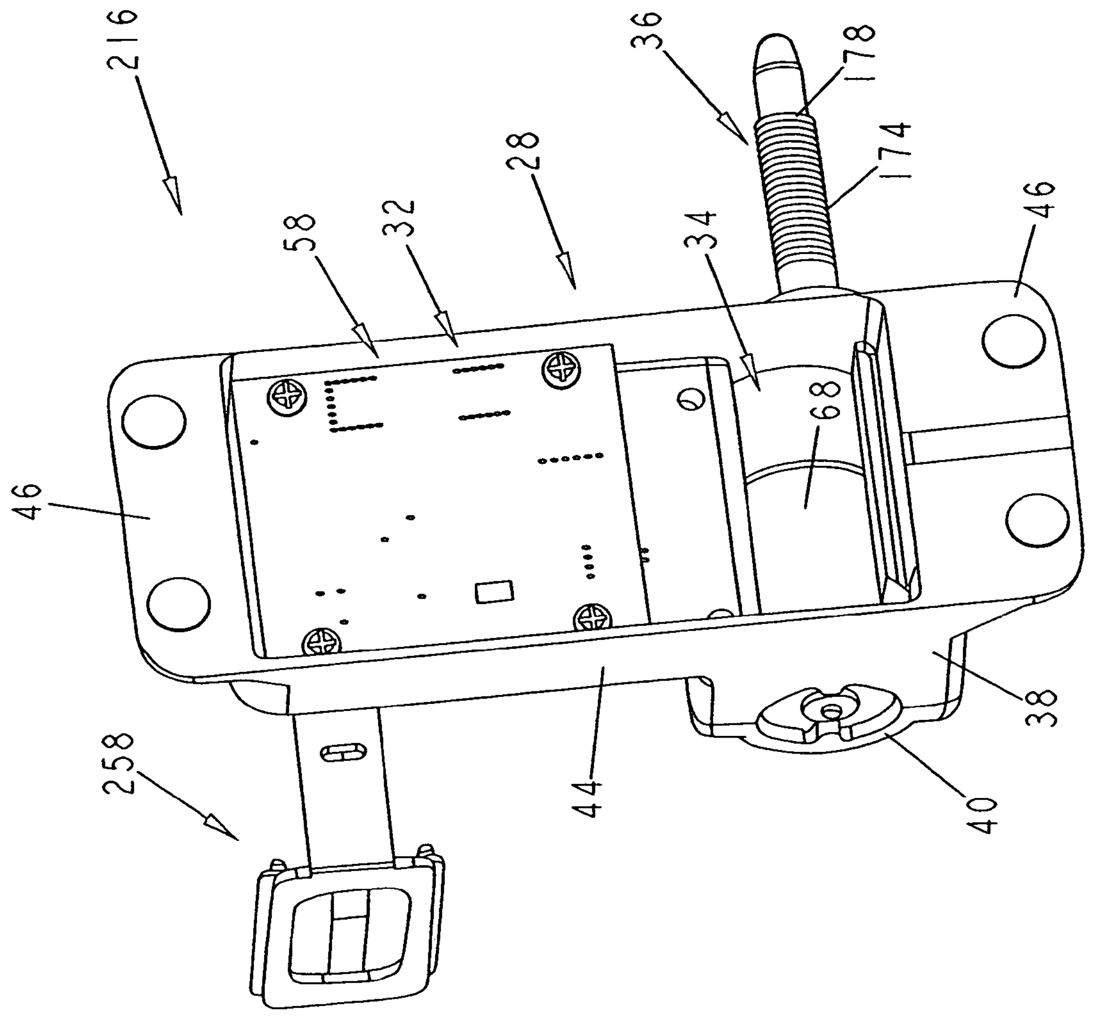
FIG. 18 is another perspective view of the first portion of the second embodiment.

Antenna assembly 258 is coupled to housing 28 in the following manner: End 182 of antenna 260 is coupled to controls 32. First arm 264 and second arm 266 of antenna support 256 are positioned over control coupler aperture 50. Each arm 264, 266 includes a chamfer or lead-in surface 274, 276. The antenna support is moved toward housing 28 such that chamfer surfaces 274, 276 contact face 42 or perimetrical surface 272 of antenna assembly coupler 144 as shown in FIG. 16. Chamfer surfaces 274, 276 cause first arm 264 and second arm 266 to deflect inward, thereby allowing coupler 262 to enter control coupler aperture 50. Once coupler 262 is beyond perimetrical surface 272 of antenna assembly coupler 144, arms 264, 266 move toward their original position. Catches 268, 270 prevent the removal of antenna support 256 in a direction 298, as indicated in FIG. 17.

Figure 21:
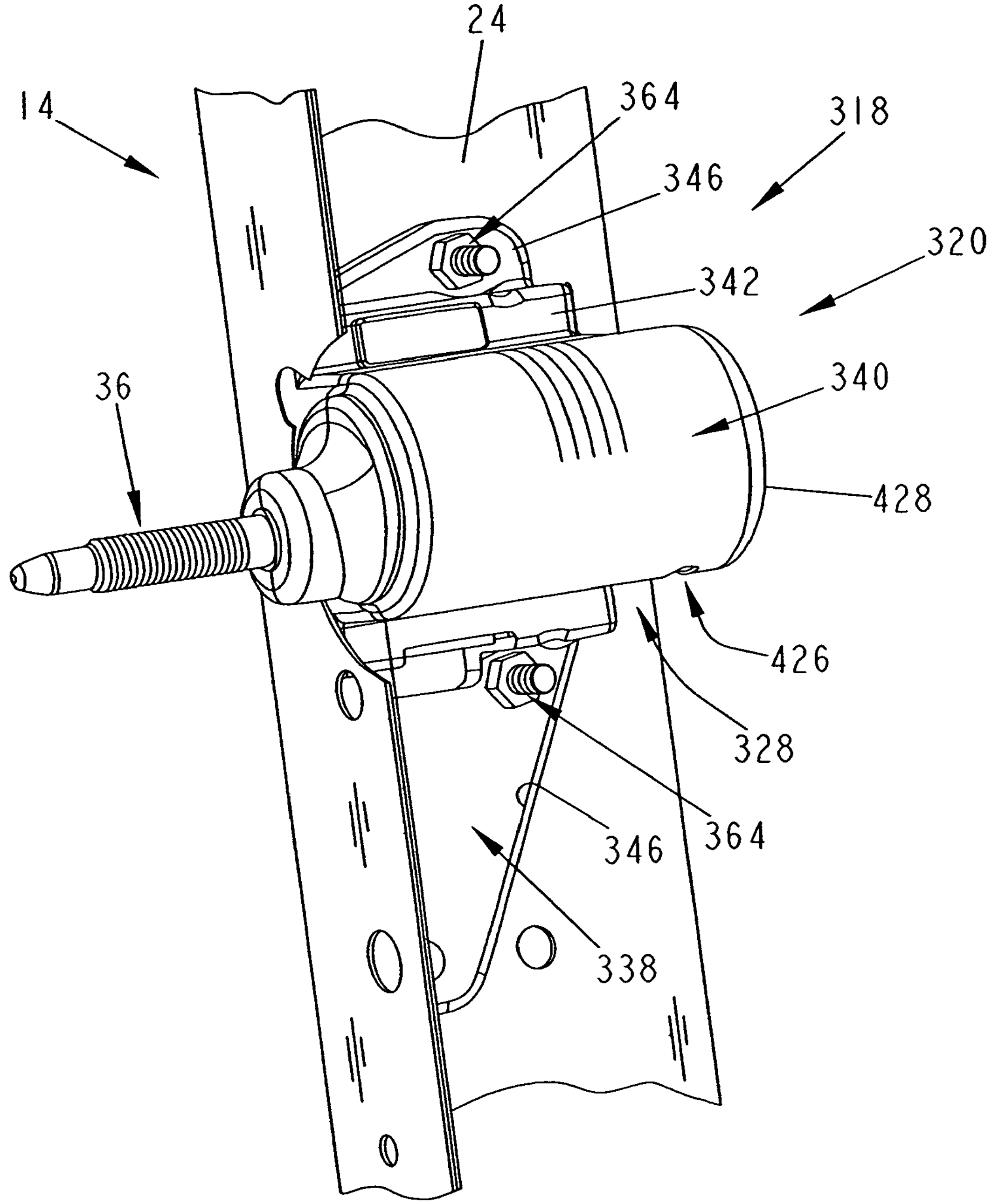
FIG. 21 is a perspective view of a first portion of a third embodiment lock mounted to the door.
Figure 22:
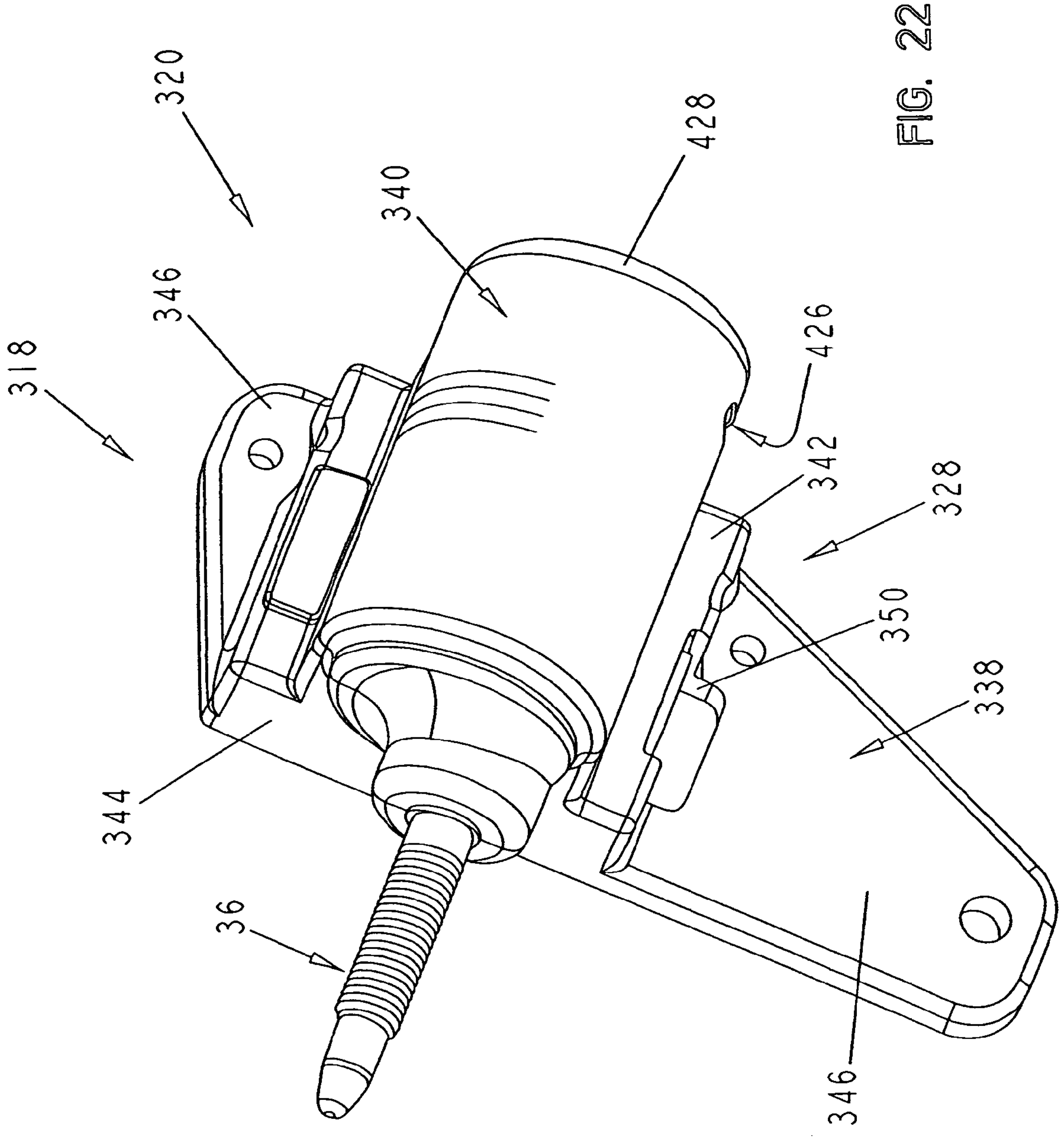
FIG. 22 is another perspective view of the first portion of the third embodiment lock.

A third embodiment lock 318 is provided in FIGS. 21–25 that blocks movement of door 14 from a closed position to an opened position. Lock 318 includes a first portion 320 and second portion 22, substantially similar to second portion 22 of lock 18, that are coupled to door 14 and cabinet 12. As shown in FIG. 21, first portion 320 of lock 318 is coupled to perimeter sidewall 24 of door 14.

First and second portions 320, 22 of lock 318 are positioned relative to door 14 and cabinet 12, respectively, so that first and second portions 320, 22 can interact with each other to secure and seal door 14 to cabinet 12. In addition, first and second portions 320, 22 of lock 318 are coupled to vending machine 10 so that entire lock 318 is positioned within interior region 16 of vending machine 10.

Figure 23:
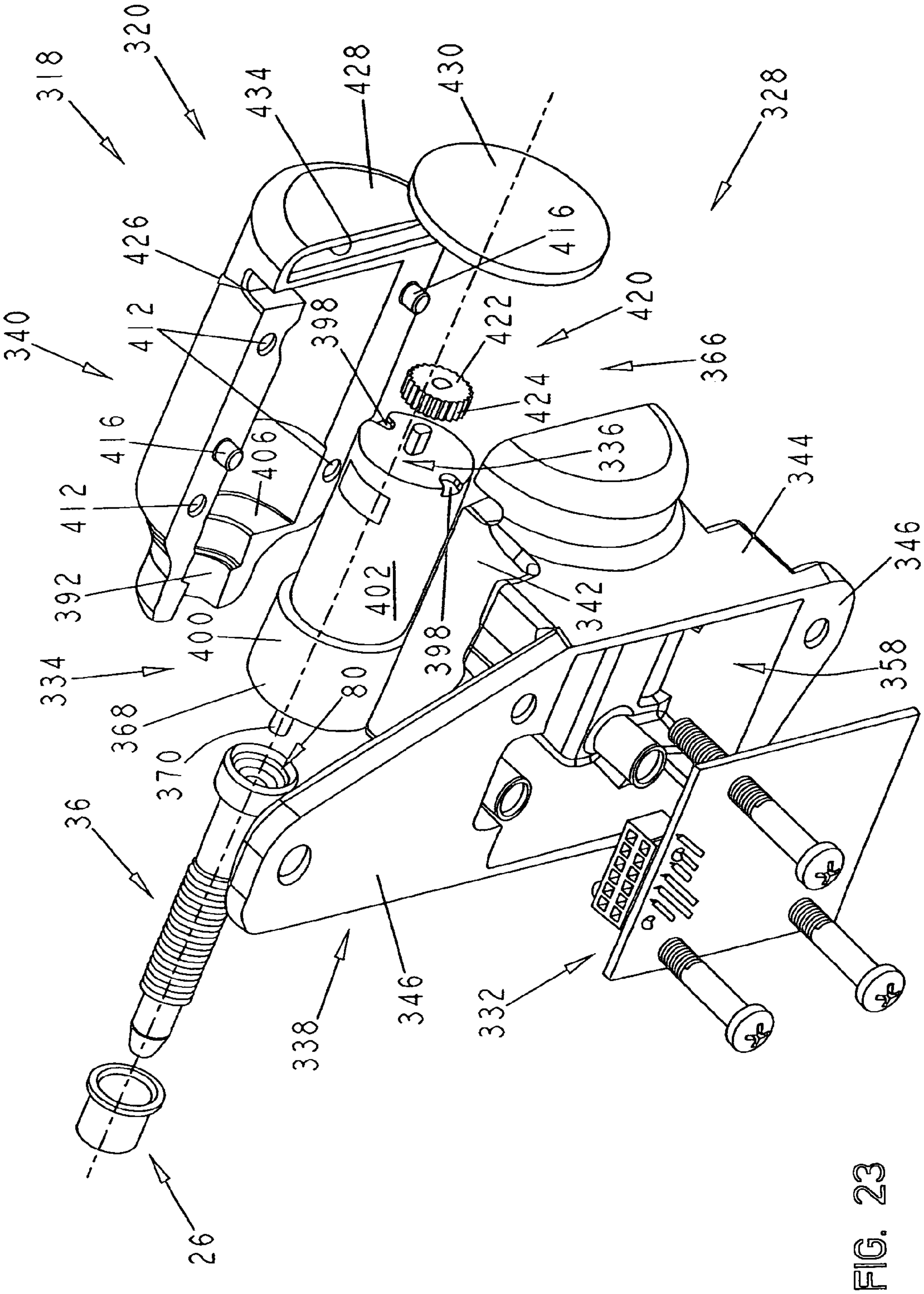
FIG. 23 is an exploded, perspective view of the first portion of the third embodiment lock.
Figure 24:
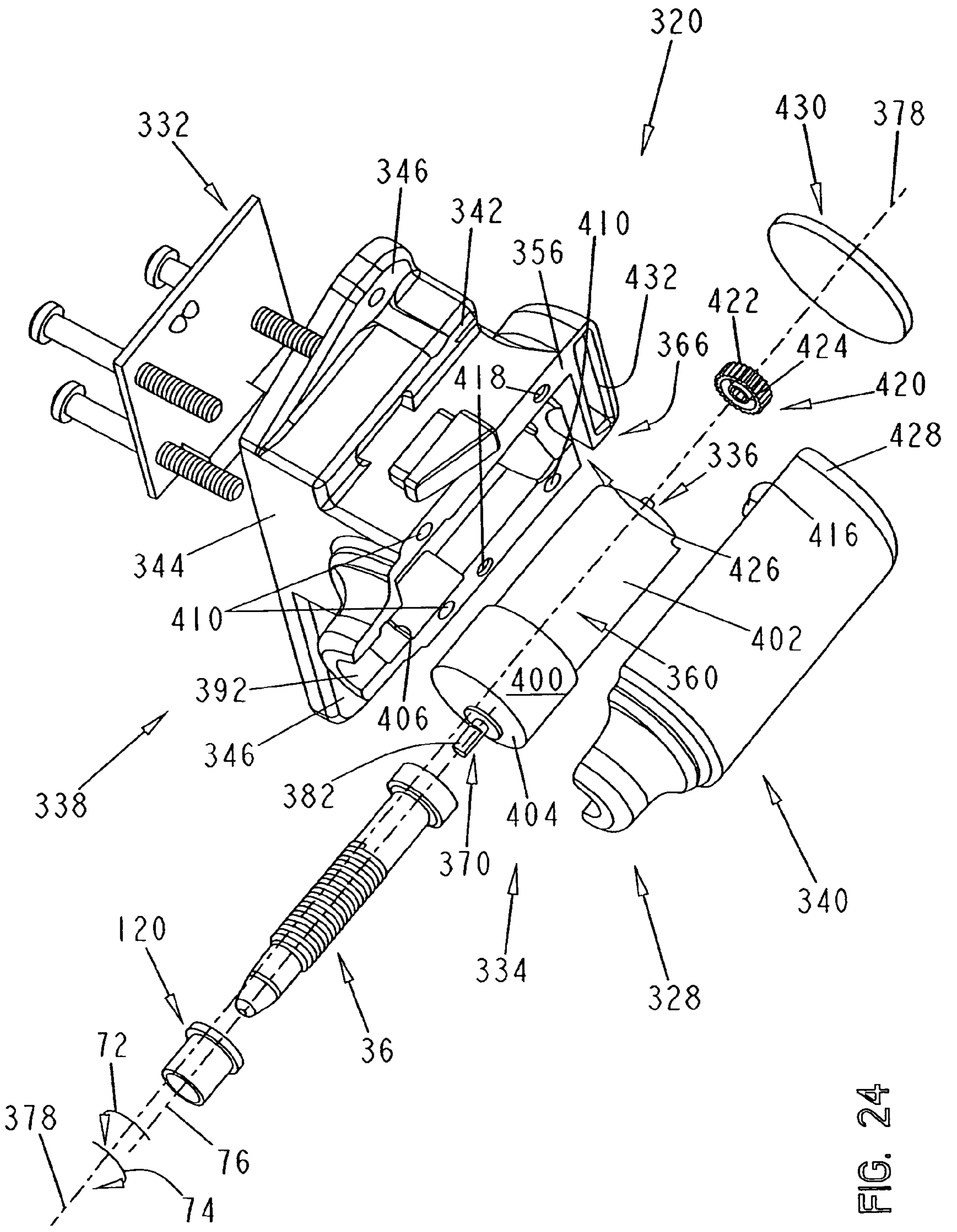
FIG. 24 is another exploded, perspective view of the first portion of the third embodiment lock.
Figure 25:
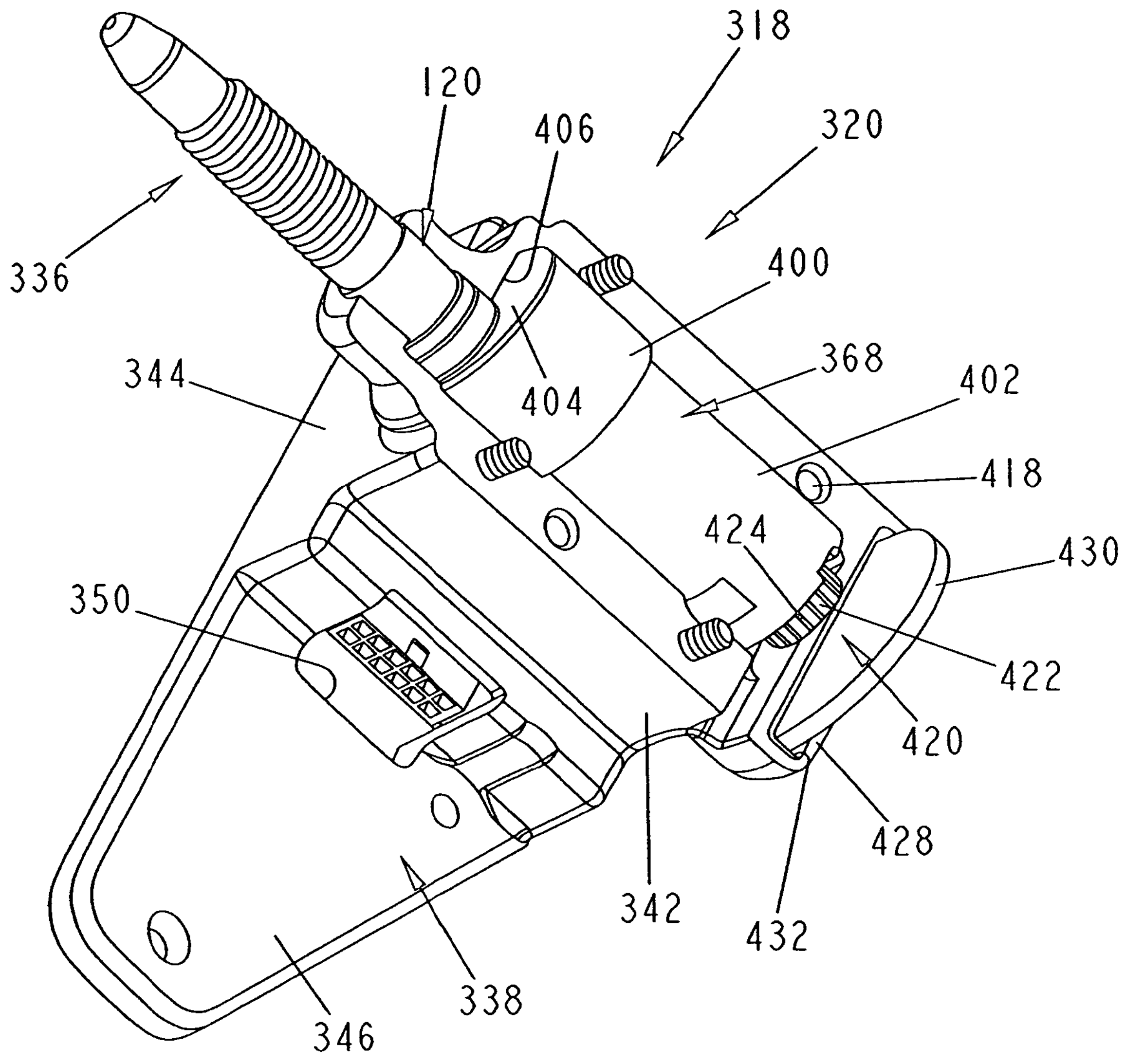
FIG. 25 is a perspective view of the first portion of the third embodiment lock with a portion of the housing removed.

First portion 320 of lock 318 includes a housing 328, controls 332, an electric lock member mover or motor 334, and lock member or threaded rod 36 as shown in FIGS. 23–25. Housing 328 is a mount that supports motor 334 and rod 36 on door 14 so that rod 36 is rotatably supported on door 14. Housing 328 includes a door mount portion 338 adapted to couple to door 14 and a motor support portion 340 configured to couple motor 334 to door mount portion 338.

Door mount portion 338 includes a face 342, sidewalls 344 coupled to the perimeter of face 342, and coupler portions 346 coupled to sidewalls 344. Face 342 of door mount portion 338 is formed to include the following portions that receive and couple to other components of first portion 320 of lock 318: a control coupler aperture 350 and a motor coupler 356.

Face 342 and sidewalls 344 of door mount portion 338 of housing 328 define a chamber 358 in which controls 332 are positioned. Controls 332 are protected from unauthorized access by face 342 and sidewalls 344 of housing 328 and perimeter sidewall 24 of door 14 to which housing 328 is coupled. Controls 332 determine if the token is authorized access to interior region 16 of vending machine 10.

Bolts or couplers 364 fasten coupler portions 346 of housing 328 to door 14 of vending machine 10. Controls 332 are coupled to a communication device (not shown) that communicates with an input to controls 332 when a user presents a proximity card or other remote key (not shown) in the vicinity of vending machine 10. The interaction between the remote key, the communications device, and controls 332 is conventional proximity detection or radio frequency identification technology.

Motor 334 is positioned in an interior region 366 defined between motor coupler 356 of housing 328 and motor support portion 340 as shown, for example, in FIG. 23. Motor 334 includes an outer housing 368, a gear head (not shown), an output shaft 370, and an input shaft 336. Output shaft 370 transfers the output of motor 334 to rod 36 and rotates in one of two directions 72, 74 about an axis 76. Motor 334 includes an axis 378 that is spaced apart from and parallel to axis 76.

Rod 36 is coupled to and collinear with output shaft 370 of motor 334 so that motor 334 is able to rotate rod 36 in directions 72, 74 about axis 76. As shown in FIG. 23, rod 36 includes aperture 80 that receives output shaft 370 of motor 334. In the illustrated embodiment, output shaft 370 includes a D-shaped portion 382 that slides into the D-shaped aperture in rod 36.

As shown in FIG. 25, head 84 of rod 36 is positioned adjacent to motor 334 between motor coupler 356 and motor support portion 340. Motor coupler 356 and motor support portion 340 each include a recess 392 that is sized and shaped to receive head 84 of rod 36 and a recess 394 that is sized and shaped to receive a portion of shaft 86 of rod 36 as shown in FIGS. 23 and 24.

Motor coupler 356 of housing 328 includes a key or lug (not shown) that is positioned in a slot or lug-receiving notch 398 of outer housing 368 of motor 334. Lug 396 and lug-receiving notch 398 cooperate to limit the counter-rotation of motor 334 when motor 334 is rotating rod 36. Offset axes 378, 76 also assist in limiting counter-rotation of motor 34.

Motor 334 has a 187:1 gear ratio. Outer housing 368 of motor 334 includes a first portion 400 having a first radial extent and a second portion 402 having a second radial extent which is smaller than the radial extent of first portion 400. First portion 400 includes a face 424 which is used to locate motor 334 in motor coupler 356 and motor support portion 340. Face 404 abuts against a stop surface 406 in motor coupler 356 and motor support portion 340.

Motor coupler 356 of door mount portion 338 of housing 328 and motor support portion 340 include apertures 410, 412, respectively, that align with each other and receive couplers or bolts 414. Bolts 414 extend through apertures 410, 412 and couple motor support portion 340 to door mount portion 338 of housing 328. To assist in aligning motor support portion 340 and door mount portion 338, motor coupler 356 includes projections 416 and motor support portion 340 includes apertures 418 that receive projections 416 as shown in FIGS. 23 and 24.

Interposed between rod 36 and motor coupler 356 and motor support portion 340 is sleeve 120. Head 84 of rod 36 is positioned adjacent to flange 126 of sleeve 120, such that shaft 86 of rod 36 is received within the opening of body portion 122 of sleeve 120. Motor coupler 356 and motor support portion 340 each include recess 392 that is sized and shaped to receive flange 126 of sleeve 120 and recess 394 that is sized and shaped to receive a portion of body portion 122 of sleeve 120.

Coupling region 336 provides multiple ports to receive inputs from a main and auxiliary power supply and a door position detection device (not shown). In alternative embodiments, the coupling region may include ports for other functions including, for example, a handheld device through which a user could add or delete authorized users or collect information about usage of lock 318.

To secure and seal door 14 of vending machine 10 relative to cabinet 12 of vending machine 10, a user moves door 14 toward cabinet 12 so that rod 36 enters housing 142 of second portion 322 of lock 318. As rod 36 is pushed into housing 142, rod 36 passes through fastener 144, engages plunger 148, and compresses spring 146. Once a user stops pushing rod 36 into housing 142, the threaded inner surface of fastener 144 engages rod 36 and secures door 14. When the door position detection device determines that rod 36 is in the vicinity of second portion 322 of lock 318, the door position detection device communicates with controls 332 so that controls 332 activate motor 334 to rotate rod 36 in direction 72. Rotation of rod 36 in direction 72 threads rod 36 further into housing 142 to ensure that door 14 and cabinet 12 of vending machine 10 are properly sealed. Motor 334 stops rotating rod 36 after fifteen seconds of operation or when a predetermined torque is being exerted by motor 334.

In preferred embodiments, the door position detection device causes controls 332 to start motor 334 when rod 36 abuts or engages fastener 144. In addition, in preferred embodiments, motor 334 is delayed in rotating rod 36 in direction 72 until the door position detection device determines that rod 36 is in the vicinity of second portion 322 of lock 318 for a predetermined amount of time. In preferred embodiments, this predetermined amount of time is approximately one second.

To open door 14 of vending machine 10, a user presents a token or remote key in the vicinity of vending machine 10. As discussed above, if controls 332 determine that the token is authorized access to vending machine 10, controls 332 instruct motor 334 to rotate rod 36 in direction 74. Rotation of rod 36 in direction 74 threads rod 36 out of fastener 144 and housing 142. Motor 334 stops rotating after fifteen seconds of operation or when the door position detection device determines that rod 36 is spaced apart from second portion 322 of lock 318.

When power loss to vending machine 10 occurs and power is later restored, if the bolt detection member determines that rod 36 is in the vicinity of second portion 322 of lock 318, controls 332 bump motor 334 and rotate rod 36 in direction 72 to ensure that door 14 and cabinet 12 are sealed.

Lock 318 also includes a mechanical lock member mover 420 configured to permit unlocking of lock 318 when power to motor 334 is lost. Mechanical lock member mover 420 includes a wheel 422 coupled to shaft 336 of motor 334. Wheel 422 has a plurality of teeth or ridges 424 and is accessible from the exterior of housing 328 through an access aperture 426 defined in door mount portion 338 and motor support portion 340 of housing 328.

When power or control of motor 334 is unavailable, a user must remove one of buttons 423 of door 14 and insert a relatively thin object, such as a paper clip or small screwdriver, into access aperture 426. The user then must rotate wheel 422 using the small object. Rotation of wheel 422 causes input shaft 336 to rotate and causes output shaft 370 of motor 334 and rod 36 to also rotate.

Using wheel 422 to unlock rod 36 is configured to be tedious and time consuming. Because aperture 426 limits the access to wheel 422, it is difficult to turn wheel 422. Furthermore, because the gear head is positioned between input shaft 336 and output shaft 370 of motor 334, wheel 422 must be turned 187 times to turn rod 36 once. If, for example, it took 3 seconds to turn wheel 422 once, it would take approximately 45 minutes to unlock rod 36. Thus, the limited access to wheel 422 and the gear head coupling of wheel 422 to rod 36 through input shaft 336, the gear head, and output shaft 370 makes using wheel 422 inconvenient and time consuming.

If motor 334 or controls 332 go bad or operation of motor 334 is lost for any other reason, maintenance personnel can unlock rod 36 using wheel 422. But, the difficulty of using wheel 422 to unlock lock 318 makes it not worth the effort of an unauthorized person to unlock lock 318. Furthermore, using wheel 422 to unlock rod 36 is so time consuming that the unauthorized person would likely be detected attempting the unauthorized access.

According to alternative embodiments of the present disclosure, other mechanical lock member mover are provided to permit movement of rod 36 when motor 334 is unpowered. For example, according to one embodiment, just enough of the input shaft is accessible through a limited access aperture to permit clamping the input shaft with a small pair of pliers, such as needle-nose pliers, making it difficult and time consuming to rotate the input shaft. Other alternative embodiments known to those of ordinary skill in the art are provided to rotate rod 36 when motor 334 is unpowered.

To prevent access to wheel 422 through an end 428 of housing 328, a circular steel plate 430 is provide in end 428. Door mount portion 338 and motor support portion 340 are each made of a zinc alloy and are formed to include plate-receiving grooves 432, 434 sized to receive plate 430. Thus, if an unauthorized person attempts to access wheel 422 by drilling through end 428 of housing 328, plate 430 will block or slow down the drilling or other attempted access to wheel 422 through end 428 of housing 328.

Figure 26:
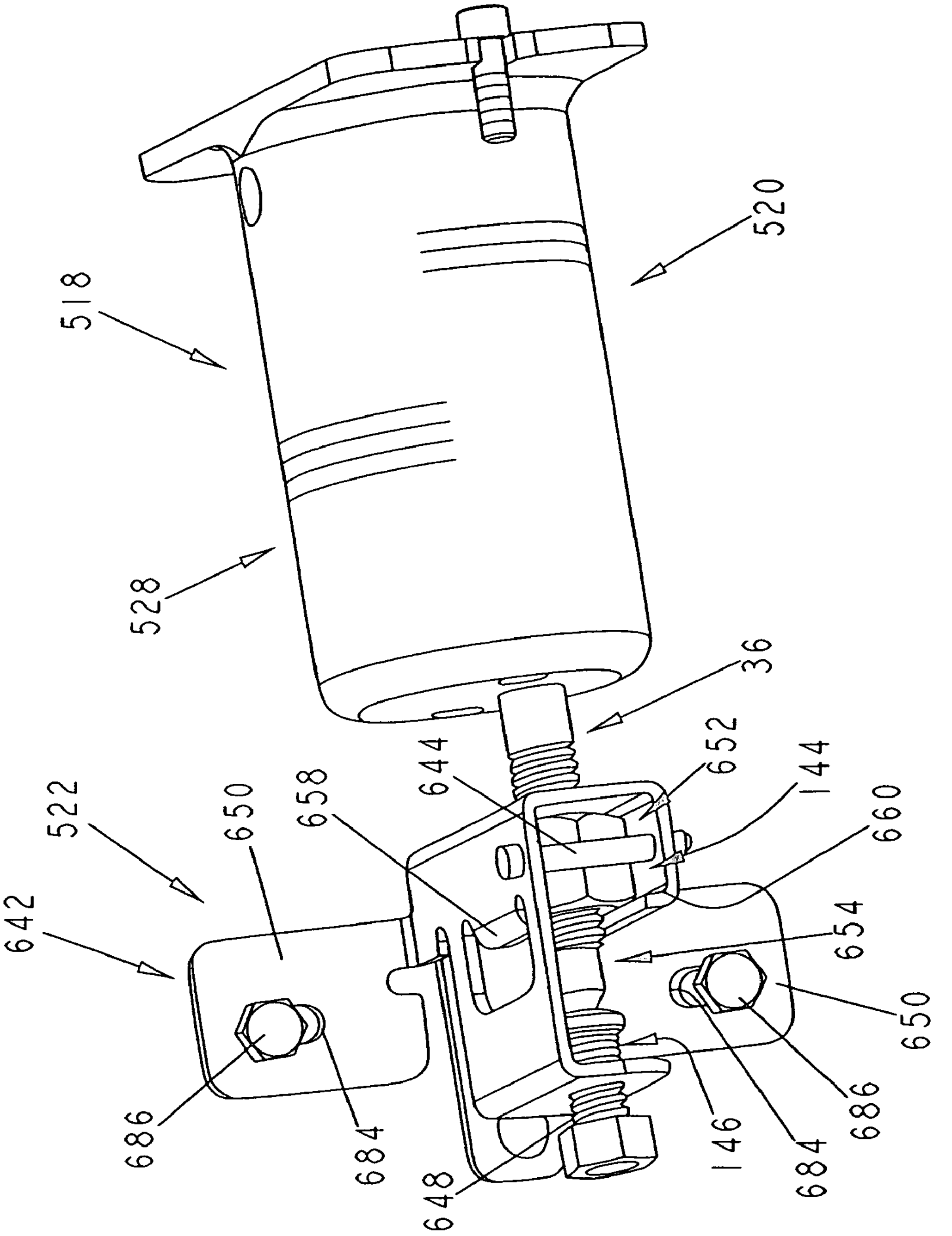
FIG. 26 is a perspective view of a fourth embodiment lock showing the lock including a first portion and a second portion.
Figure 27:
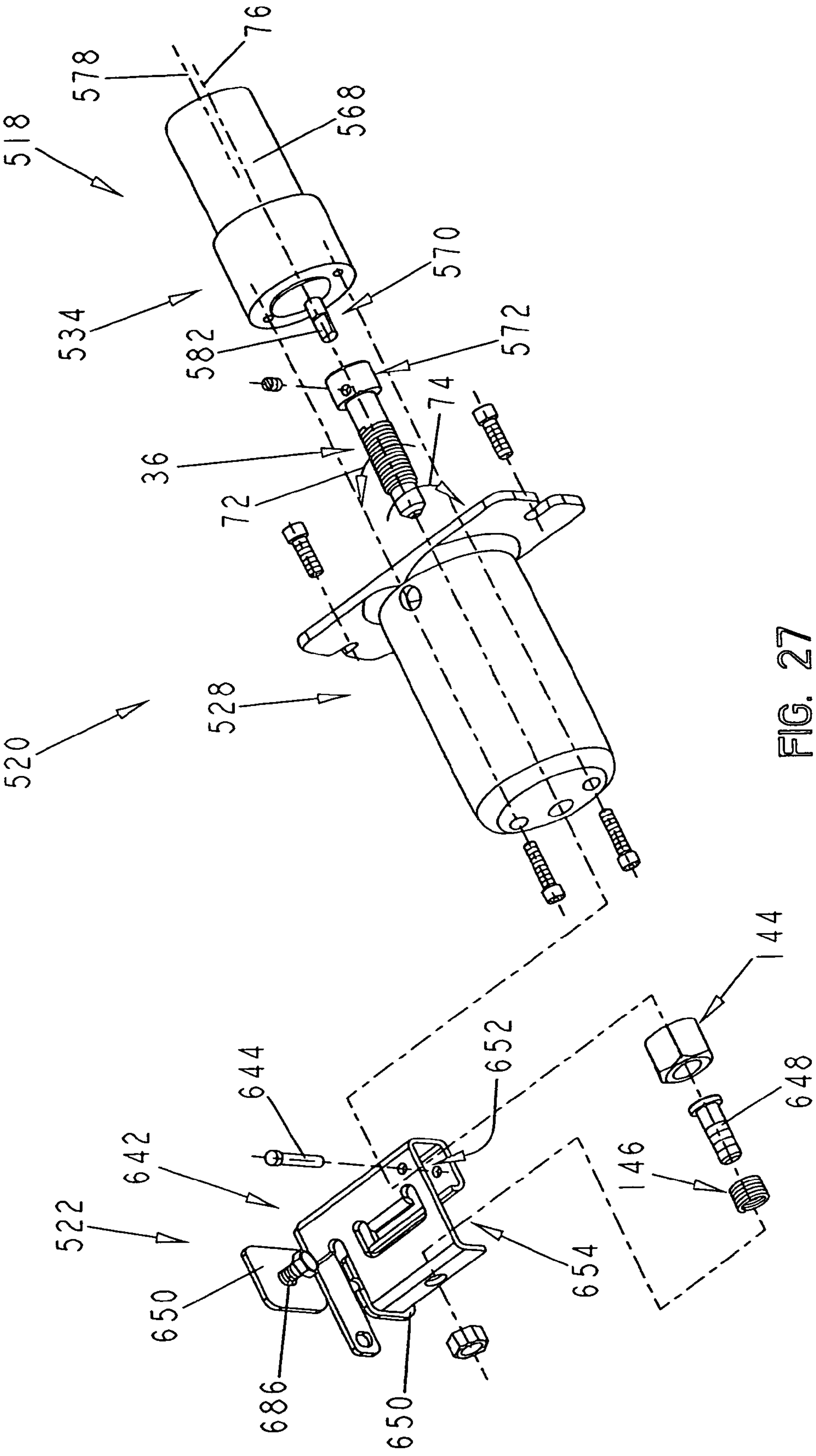
FIG. 27 is an exploded, perspective view of the fourth embodiment lock.

Another lock 518 is provided in FIGS. 26 and 27 that blocks movement of door 14 from a closed position to an opened position. Lock 518 includes first and second portions 520, 522 that are coupled to door 14 and cabinet 12, respectively. First portion 520 of lock 518 is coupled to perimeter sidewall 24 of door 14. Second portion 522 of lock 518 is coupled to one of sidewalls 26 of cabinet 12. According to alternative embodiments of the present disclosure, the first portion is coupled to the cabinet and the second portion is coupled to the door.

First and second portions 520, 522 of lock 518 are positioned relative to door 14 and cabinet 12, respectively, so that first and second portions 520, 522 can interact with each other, as shown in FIG. 26, to secure and seal door 14 to cabinet 12. In addition, first and second portions 520, 522 of lock 518 are coupled to vending machine 10 so that entire lock 518 is positioned within interior region 16 of vending machine 10.

First portion 520 includes a motor mount 528, controls (not shown), an electric lock member mover or motor 534, and a lock member or threaded rod 36 as shown in FIG. 27. Mount 528 supports motor 534 and rod 36 on door 14 so that rod 36 is rotatably supported on door 14.

Motor 534 is positioned in an interior region defined in mount 528. Motor 534 includes an outer housing 568, a gear head (not shown), and an output shaft 570. Output shaft 570 transfers the output of motor 534 to rod 36 and rotates in one of two directions 72, 74 about an axis 76. Motor 534 includes an axis 578 that is spaced apart from and parallel to axis 76 of output shaft 570.

Rod 36 is coupled to and collinear with output shaft 570 of motor 534 so that motor 534 is able to rotate rod 36 in directions 72, 74 about axis 76. Rod 36 includes an aperture (not shown) that receives output shaft 570 of motor 534. In the illustrated embodiment, output shaft 570 includes a D-shaped portion 582 that slides into a D-shaped aperture in rod 36. A collar and set screw arrangement 572 is used to couple output shaft 570 of motor 534 to rod 36.

Second portion 522 of lock 518 includes a bracket/housing or mount 642, a coupler or fastener 144, a compression spring or biaser 146, a bolt/strike member or plunger 648, and a door position detection device (not shown) as shown in FIG. 27. Housing 642 includes coupling portions 650 and first and second apertures 652, 654 that receive fastener 144 and plunger 648.

Plunger 648 supports spring 146, as shown in FIG. 26. Fastener 144 is positioned in second aperture 654 and held in place due to the force exerted by spring 146 and plunger 648 on fastener 144. A pin 644 is also provided that retains fastener 144 in second aperture 654. Second portion 522 further includes a pair of flanges 658, 660 to block movement of fastener 144 during insertion of rod 36.

Compression spring 146 is preferably positioned between fastener 144 and housing 642 so that it is also positioned between rod 36 and housing 642. This positioning results in rod 36 being urged away from both fastener 144 and cabinet 12. According to alternative embodiments of the present disclosure, the spring is positioned in other locations resulting in the rod being urged away from the fastener and/or the cabinet. For example, according to one alternative embodiment, the spring is positioned between the rod and the fastener. According to another embodiment, the spring is positioned between the door and the cabinet to urge the rod away from the fastener and/or the cabinet.

In the illustrated embodiment, coupling portions 650 of housing 642 include apertures 684. As shown in FIG. 26, bolts or couplers 686 extend through aperture 684 to couple housing 642 of second portion 522 of lock 518 to cabinet 12 of vending machine 10.

To secure and seal door 14 of vending machine 10 relative to cabinet 12 of vending machine 10, a user moves door 14 toward cabinet 12 so that rod 36 enters housing 642 of second portion 522 of lock 518. As rod 36 is pushed into housing 642, rod 36 passes through fastener 144, engages plunger 648, and compresses spring 146. Once a user stops pushing rod 36 into housing 642, the threaded inner surface of fastener 144 engages rod 36 and secures door 14. When the door position detection device determines that rod 36 is in the vicinity of second portion 522 of lock 518, the door position detection device communicates with the controls so that the controls activate motor 534 to rotate rod 36 in direction 72. Rotation of rod 36 in direction 72 threads rod 36 further into housing 642 to ensure that door 14 and cabinet 12 of vending machine 10 are properly sealed. Motor 534 stops rotating rod 36 after fifteen seconds of operation or when a predetermined torque is being exerted by motor 34.

In preferred embodiments, the door position detection device causes the controls to start motor 534 when rod 36 abuts or engages fastener 144. In addition, in preferred embodiments, motor 534 is delayed in rotating rod 36 in direction 72 until the door position detection device determines that rod 36 is in the vicinity of second portion 522 of lock 518 for a predetermined amount of time. In preferred embodiments, this predetermined amount of time is approximately one second.

To open door 14 of vending machine 10, a user presents a token or remote key in the vicinity vending machine 10. As discussed above, if the controls determine that the token is authorized access to vending machine 10, the controls instruct motor 534 to rotate rod 36 in direction 74. Rotation of rod 36 in direction 74 threads rod 36 out of fastener 144 and housing 642. Motor 534 stops rotating after fifteen seconds of operation or when the door position detection device determines that rod 36 is spaced apart from second portion 522 of lock 518. Plunger 648 and compression spring 146 bias rod 36 out of housing 642 to assist motor 534 in threading rod 36 out of fastener 144 and housing 642.

When power loss to vending machine 10 occurs and power is later restored, if the bolt detection member determines that rod 36 is in the vicinity of second portion 522 of lock 518, the controls bump motor 534 and rotate rod 36 in direction 72 to ensure that door 14 and cabinet 12 are sealed.

Figure 28:
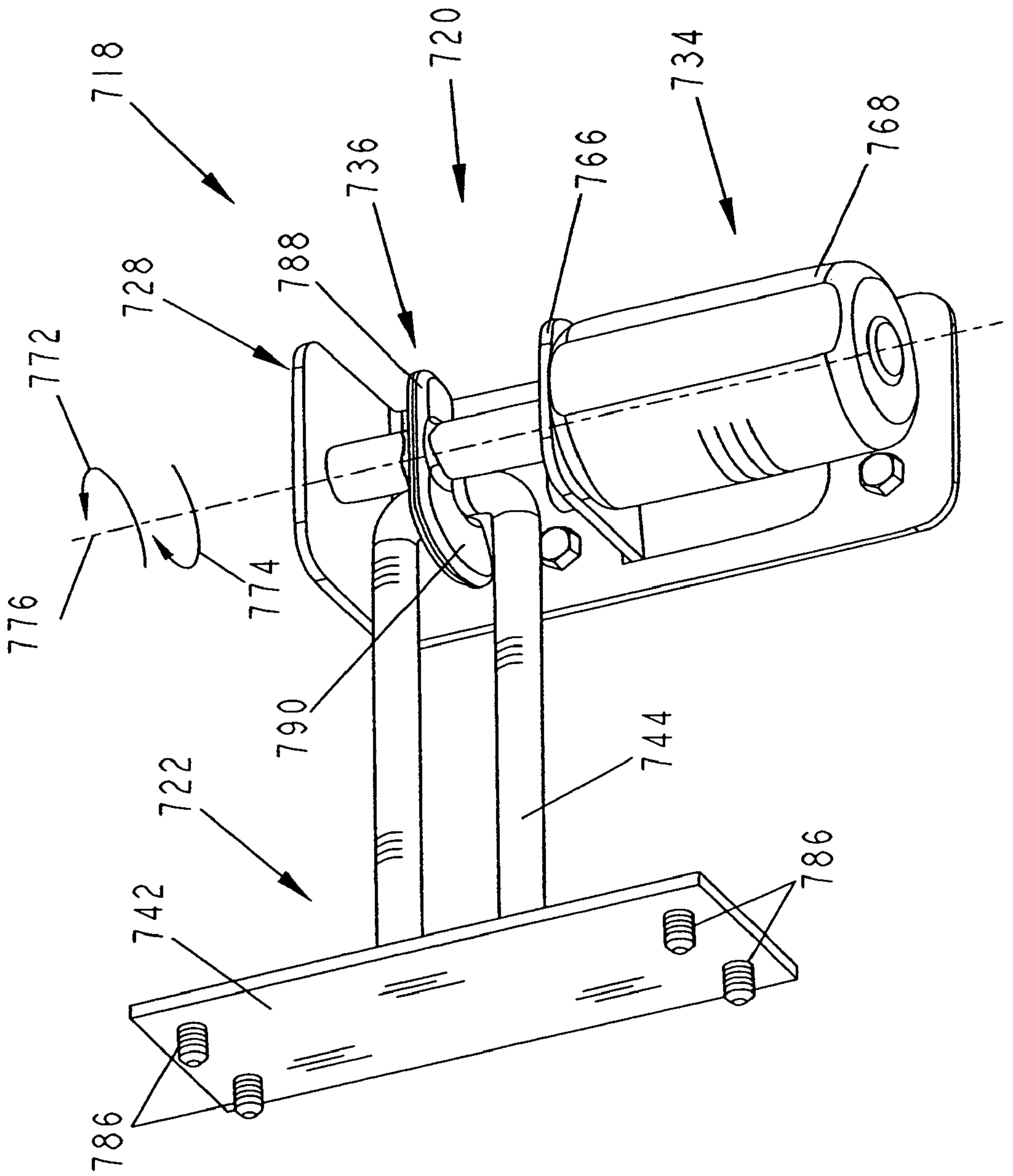
FIG. 28 is a perspective view of a fifth embodiment lock showing the lock including a first portion and a second portion.
Figure 29:
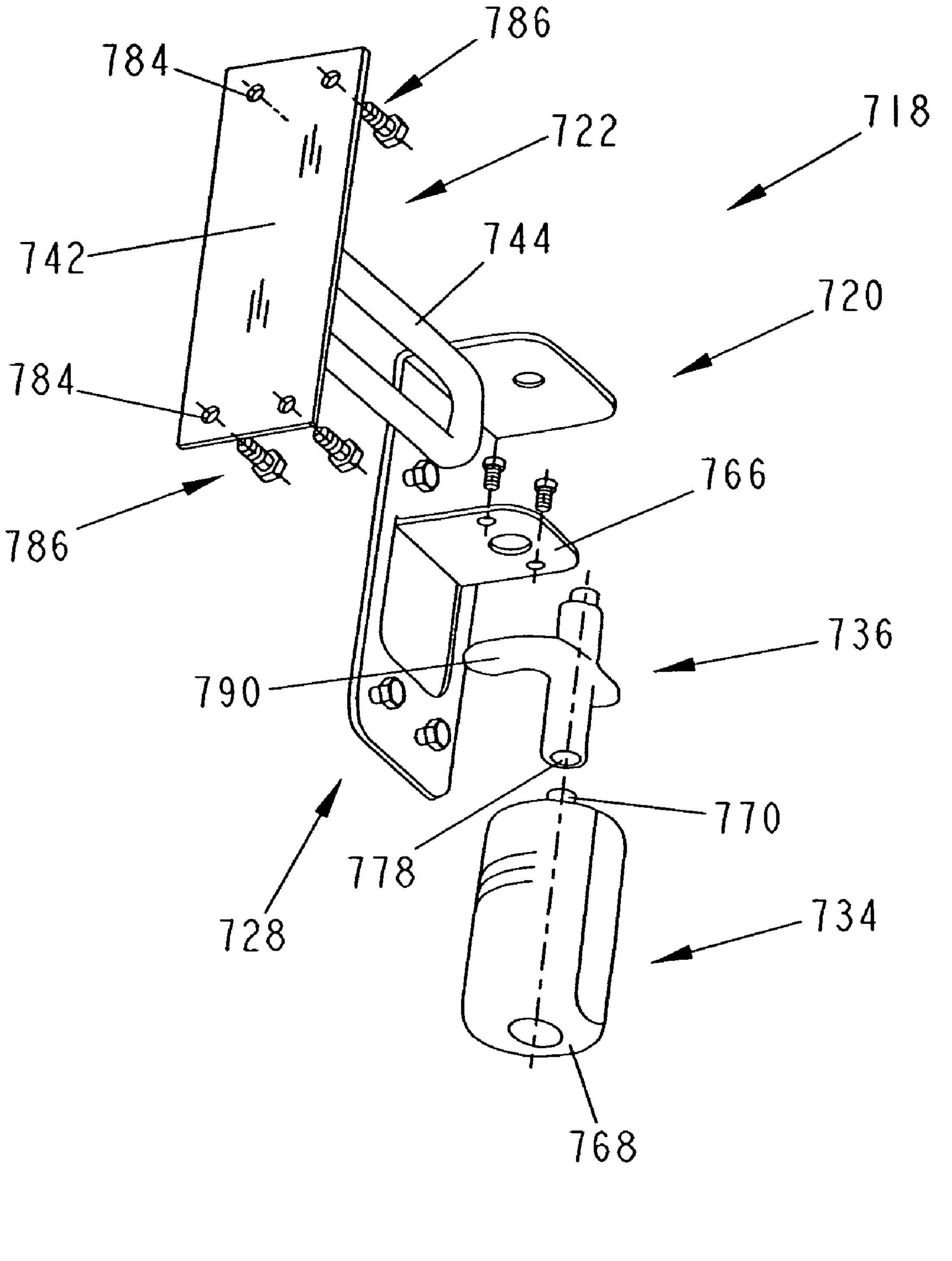
FIG. 29 is an exploded, perspective view of the fifth embodiment lock.
Figure 30:
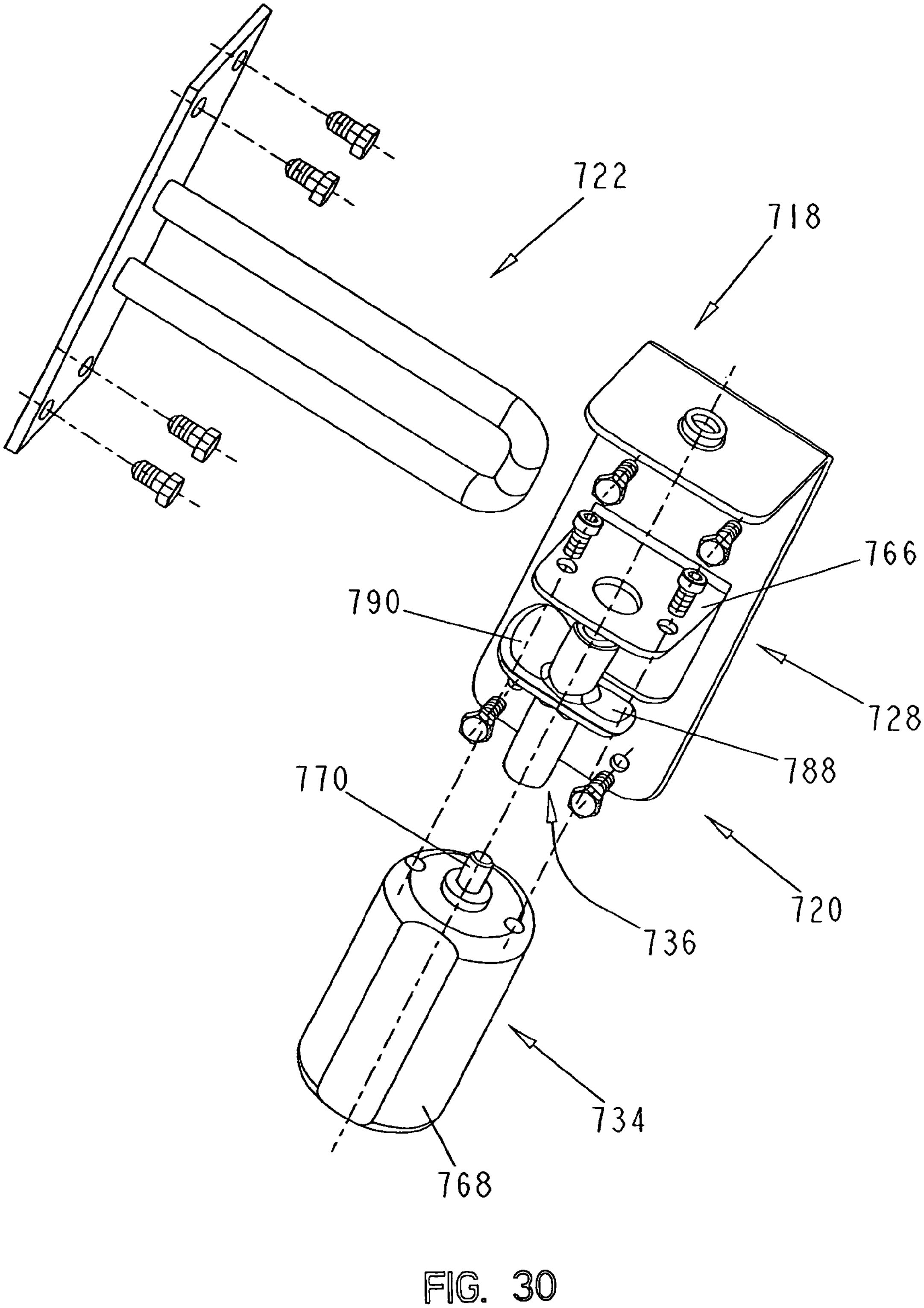
FIG. 30 is another exploded, perspective view of the fifth embodiment lock.
Figure 31:
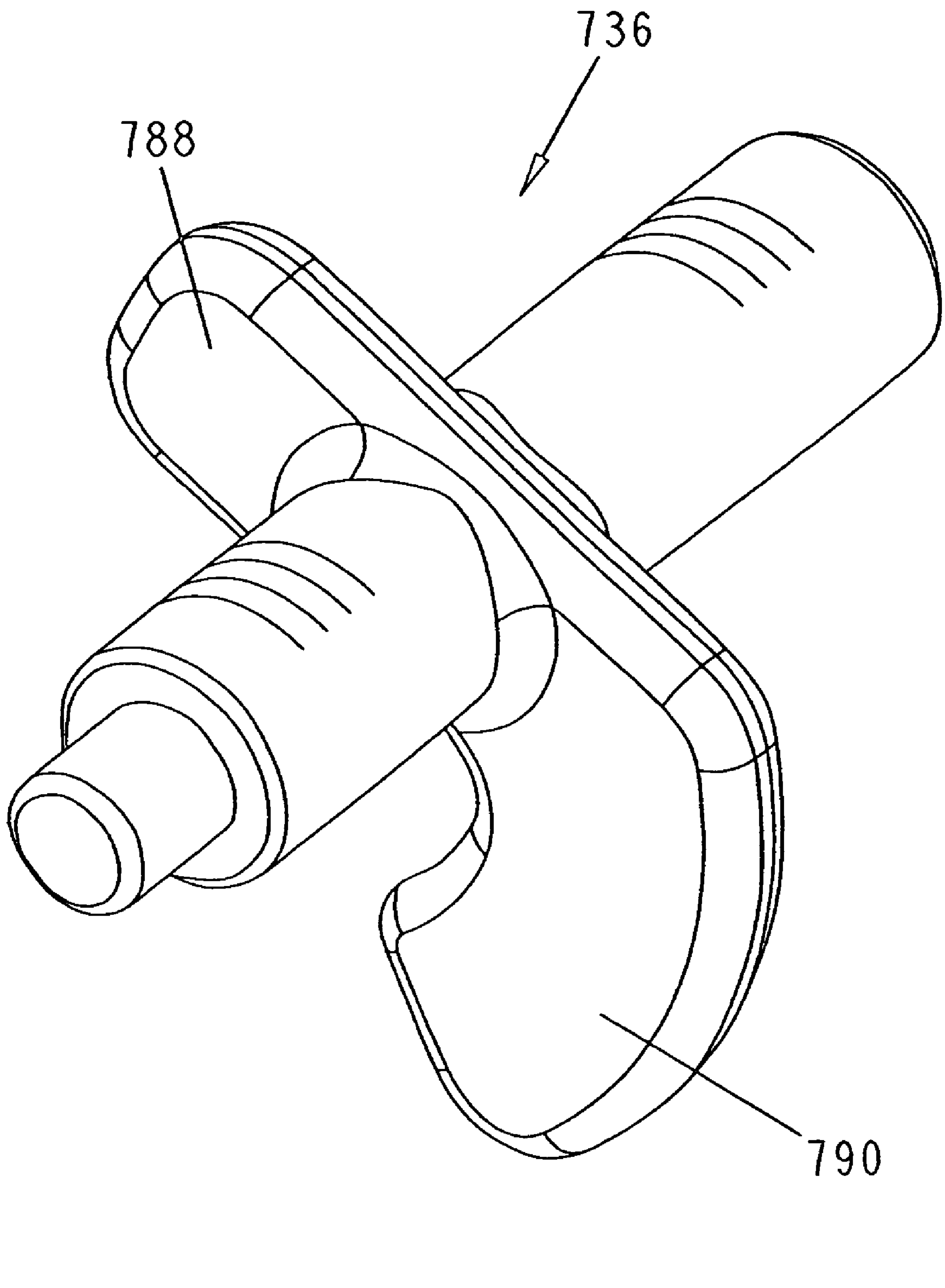
FIG. 31 is a perspective view of a hook or lock member of the fifth embodiment lock.

Another lock 718 is provided in FIGS. 28–30 that blocks movement of door 14 from a closed position to an opened position. Lock 718 includes first and second portions 720, 722 that are coupled to door 14 and cabinet 12, respectively. First portion 720 of lock 718 is coupled to perimeter sidewall 24 of door 14. Second portion 722 of lock 718 is coupled to cabinet 12. According to alternative embodiments of the present disclosure, the first portion is coupled to the cabinet and the second portion is coupled to the door.

First and second portions 720, 722 of lock 718 are positioned relative to door 14 and cabinet 12, respectively, so that first and second portions 720, 722 can interact with each other, as shown in FIG. 28, to secure and seal door 14 to cabinet 12. In addition, first and second portions 720, 722 of lock 718 are coupled to vending machine 10 so that entire lock 718 is positioned within interior region 16 of vending machine 10.

First portion 720 includes a motor mount 728, controls (not shown), an electric lock member mover or motor 734, and a lock member or hook 736 as shown in FIG. 28. Mount 728 supports motor 734 and hook 736 on door 14 so that hook 736 is rotatably supported on door 14.

Motor 734 is supported on a flange 766 of mount 728. Motor 734 includes an outer housing 768, a gear head (not shown) and an output shaft 770. Output shaft 770 transfers the output of motor 734 to hook 736 and rotates in one of two directions 772, 774 about an axis 776.

Hook 736 is coupled to output shaft 770 of motor 734 so that motor 734 is able to rotate rod 736 in directions 772, 774 about axis 776. Hook 736 includes an aperture 778, as shown in FIG. 29, that receives output shaft 770 of motor 734.

Second portion 722 of lock 718 includes a bracket/housing or mount 742 and a cantilevered arm or fastener 744. Mount 742 includes apertures 784. As shown in FIG.

28, bolts or couplers 786 extend through aperture 784 to couple mount 742 of second portion 722 of lock 718 to cabinet 12 of vending machine 10.

To secure and seal door 14 of vending machine 10 relative to cabinet 12 of vending machine 10, a user moves door 14 toward cabinet 12. When door 14 is in the opened position, hook 736 is rotated 180° from the position shown in FIG. 28 so that fastener 744 strikes a stop arm 788 of hook 738. When the door position detection device determines that fastener 744 is in the vicinity of first portion 720 of lock 718, the door position detection device communicates with the controls so that the controls activate motor 734 to rotate hook 736 in direction 772. Rotation of hook 736 in direction 772 causes a hook portion 790 to catch fastener 744 to block first portion 720 of lock 718 from moving relative to second portion 722 of lock 718. Thus, door 14 is locked to cabinet 12.

To open door 14 of vending machine 10, a user presents a token or remote key in the vicinity vending machine 10. As discussed above, if the controls determine that the token is authorized access to vending machine 10, the controls instruct motor 734 to rotate hook 736 in direction 774. Rotation of hook 736 in direction 774 releases fastener 744 from hook portion 790. Motor 734 stops rotating after stop arm 788 strikes fastener 744.

Figure 32:
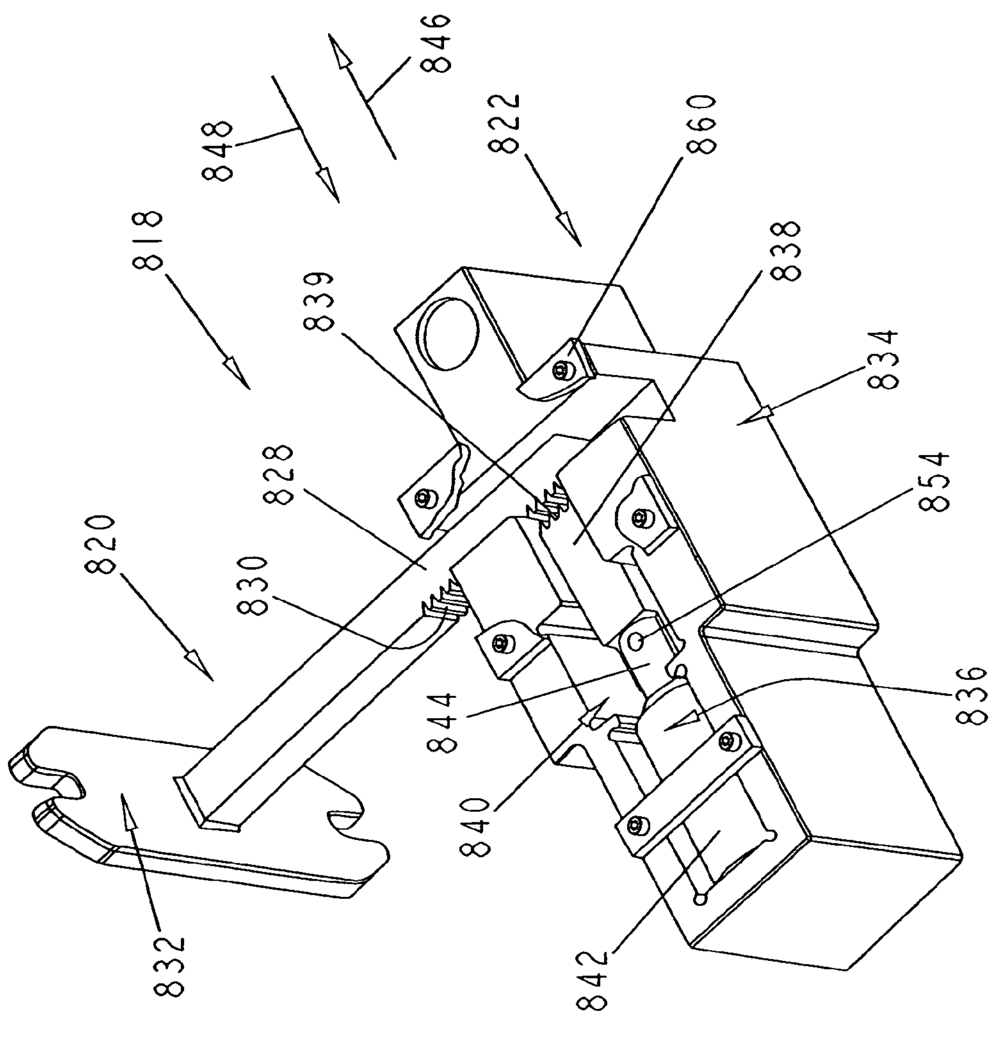
FIG. 32 is a perspective view of a sixth embodiment lock showing the lock including a T-shaped first portion and a second portion.
Figure 33:
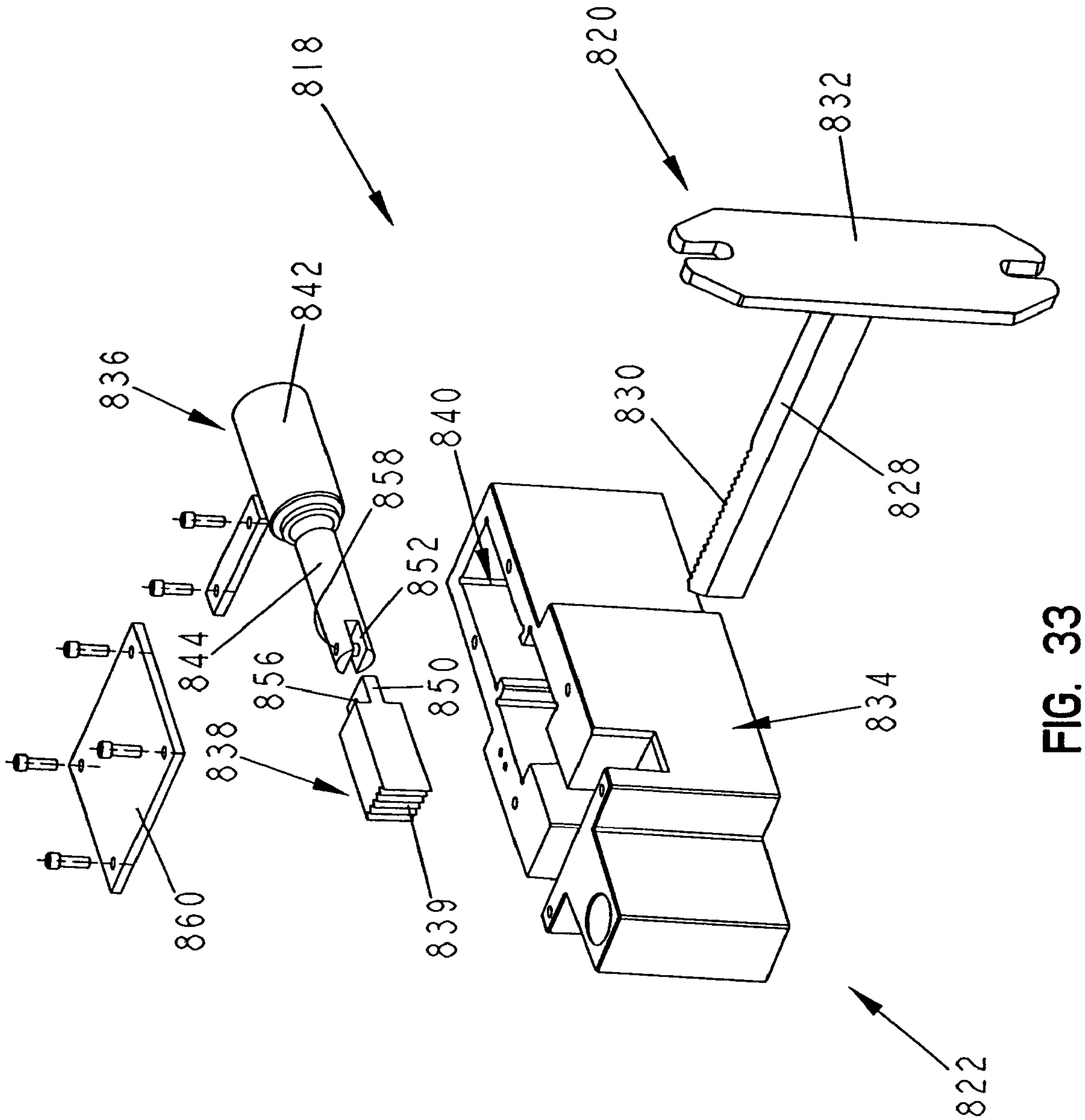
FIG. 33 is an exploded, perspective view of the sixth embodiment lock.
Figure 34:
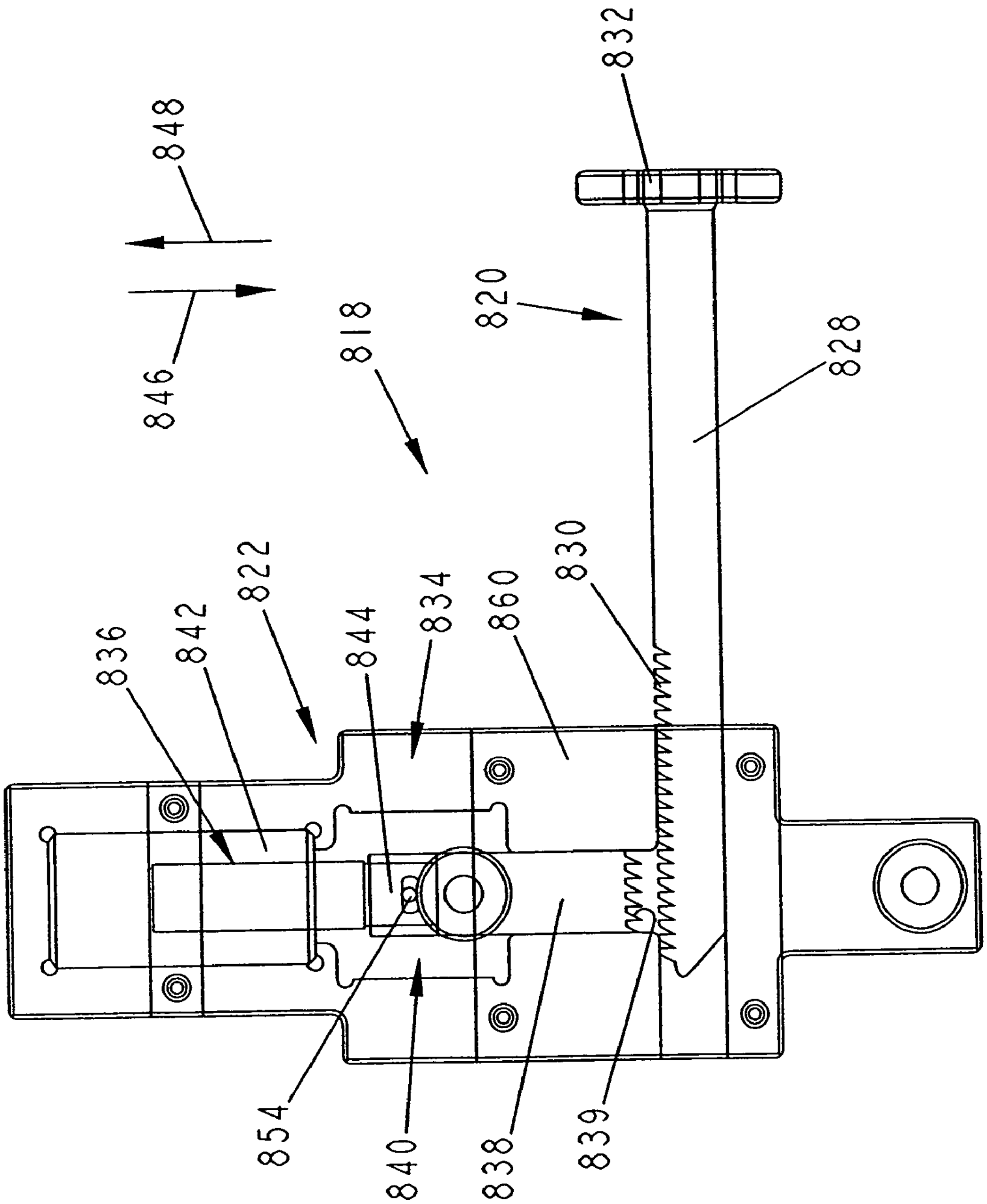
FIG. 34 is a top plan view of the sixth embodiment lock.

Another lock 818 is provided in FIGS. 32–34 that blocks movement of door 14 from a closed position to an opened position. Lock 818 includes first and second portions 820, 822 that are coupled to door 14 and cabinet 12, respectively. First portion 820 of lock 818 extends through a square aperture (not shown) in door 14. Second portion 822 of lock 818 is coupled to cabinet 12. According to alternative embodiments of the present disclosure, the first portion is coupled to the cabinet and the second portion is coupled to the door.

First and second portions 820, 822 of lock 818 are positioned relative to door 14 and cabinet 12, respectively, so that first and second portions 820, 822 can interact with each other, as shown in FIG. 34, to secure and seal door 14 to cabinet 12. In addition, second portion 822 of lock 818 is coupled to vending machine 10 so that it is positioned within interior region 16 of vending machine 10. First portion 820 is accessible from the exterior of vending machine 10 to permit removal of first portion 820 from second portion 822.

First portion 820 is substantially T-shaped having a catch portion 828 having a plurality of teeth 830 and a handle portion 832 configured to fit within a handle receiving-portion (not shown) of door 14. An exemplary handle-receiving portion is shown in U.S. Provisional Patent Application Serial No. unknown, entitled "Electro-Mechanical Vending Machine Lock", filed Oct. 17, 2001, to Palmer, the disclosure of which is expressly incorporated by reference herein.

Second portion 822 includes a solenoid mount 834, controls (not shown), an electric lock member mover or solenoid 836, and a lock member 838 having a plurality of teeth 839 that are configured to mate with teeth 830 of first portion 820 as shown in FIG. 33. Mount 834 supports solenoid 836 and lock member 838 on cabinet 12 so that lock member 838 is slidably supported on cabinet 12.

Solenoid 834 is supported in a channel 840 formed in mount 834. Solenoid 834 includes an outer housing 842 and an output shaft 844. Output shaft 844 transfers the output of solenoid 834 to lock member 838 and slides lock member 838 in one of two directions 846, 848 along channel 840. Lock member 838 includes a tongue 850 and shaft 844 includes a groove 852 sized to receive tongue 850. Tongue 850 is retained in groove 852 by a pin 854 positioned in apertures 856, 858 in tongue 850 and shaft 844. A plate 860 is provided to cover channel 840 and retain solenoid 834 and lock member 838 in mount 834.

To secure and seal door 14 of vending machine 10 relative to cabinet 12 of vending machine 10, a user moves door 14 toward cabinet 12. When the door position detection device determines that door 14 is in the closed position, the door position detection device communicates with the controls so that the controls activate solenoid 834 to slide lock member 838 in direction 846 to engage teeth 839 of lock member 838 with teeth 830 of first portion 820. This engagement locks first and second portions 820, 822 together blocking movement of door 14 relative to cabinet 12.

To open door 14 of vending machine 10, a user presents a token or remote key in the vicinity vending machine 10. As discussed above, if the controls determine that the token is authorized access to vending machine 10, the controls instruct solenoid 834 to slide lock member 838 in direction 848 to disengage teeth 839, 830. The user then pulls first portion 820 from second portion 822 and opens door 14.

Although the invention has been described in detail with reference to preferred embodiments, variations and modifications exist within the scope and spirit of the invention as described and defined in the following claims.

The invention claimed is:

1. A vending machine configured to retain objects for distribution, the vending machine comprising a cabinet defining an interior region sized to receive the objects for distribution, a door coupled to the cabinet to move between an opened position permitting access to the interior region of the cabinet and a closed position blocking access to the interior region of the cabinet, at least one of the cabinet and door having an opening sized to permit distribution of the objects while the door is in the closed position, and a lock configured to move between a locked position blocking movement of the door from the closed position and an unlocked position permitting movement of the door from the closed position, the lock including a first interactive member, a second interactive member, and a motor configured to power unlocking of the door, the second interactive member being configured to move relative to the first interactive member absent power from the motor to block the door from moving to the opened position, the motor powering relative movement between the first and second interactive members during locking.

2. The vending machine of claim 1, wherein the first interactive member is supported by the door and the second interactive member is supported by the cabinet.

3. The vending machine of claim 1, wherein the motor imparts rotational movement to at least one of the first and second interactive members.

4. The vending machine of claim 1, wherein the motor includes a housing and a shaft, the shaft remains stationary relative to the housing during the relative movement of the first and second interactive members.

5. The vending machine of claim 1, wherein the motor powers at least a portion of the unlocking of the door.

6. The vending machine of claim 5, wherein the lock further includes a biaser positioned to urge the first and second interactive members into contact.

7. The vending machine of claim 1, further comprising a seal positioned between the door and the cabinet when the door is in the closed position and wherein the motor is configured to power further movement of the second interactive member to compress the seal and seal the interior region of the vending machine.

8. A vending machine configured to retain objects for distribution, the vending machine comprising a cabinet defining an interior region sized to receive the objects for distribution, a door coupled to the cabinet to move between an opened position permitting access to the interior region of the cabinet and a closed position blocking access to the interior region of the cabinet, at least one of the cabinet and door having an opening sized to permit distribution of the objects while the door is in the closed position, a lock configured to move between a locked position blocking movement of the door from the closed position and an unlocked position permitting movement of the door from the closed position, the lock including a first interactive member and a second interactive member, and a motor configured to power movement of the lock, the first interactive member and the second interactive member being moveable between one of an engaged position and a disengaged position to the other of the engaged position and the disengaged position absent power from the motor, the first interactive member and the second interactive member blocking movement of the door to the opened position when the first interactive member and the second interactive member are in the engaged position, the motor providing relative movement between the first and second interactive members to move the door to the closed position.

9. The vending machine of claim 8, wherein the motor is configured to power at least a portion of the movement of the door from the closed position to the opened position.

10. The vending machine of claim 8, wherein the second interactive member transmits force from the motor to the door.

11. The vending machine of claim 8, wherein the motor includes a housing and a shaft, the shaft rotates relative to the housing during powered movement of the lock by the motor, the shaft remains substantially stationary relative to the housing during at least a portion of the looking of the door.

12. The vending machine of claim 8, wherein the motor rotates the first interactive member of the lock.

13. The vending machine of claim 8, wherein the first interactive member is supported by the door and the second interactive member is supported by the cabinet.

14. The vending machine of claim 8, wherein the first interactive member is rotated to disengage the first interactive member from the second interactive member.

15. The vending machine of claim 14, wherein the motor rotates the first interactive member to power movement of the lock from the locked position to permit opening of the door.

16. The vending machine of claim 8, wherein the first interactive member and the second interactive member are moveable between the engaged position and the disengaged position absent power from the motor and between the disengaged position and the engaged position absent power from the motor.

17. A vending machine configured to retain objects for distribution, the vending machine comprising a cabinet defining an interior region sized to receive the objects for distribution, a door coupled to the cabinet to move between an opened position permitting access to the interior region of the cabinet a plurality of intermediate positions, and a closed position blocking access to the interior region of the cabinet at least one of the cabinet and door having an opening sized to permit distribution of the objects while the door is in the closed position, a seal positioned between the cabinet and the door, a lock, and a motor, the door being moveable to one of the intermediate positions by a manual input, the lock blocking movement of the door to the opened position from each of the intermediate positions, the motor being configured to power movement of the door to the closed position from the intermediate position to compress the seal.

18. The vending machine of claim 17, wherein the lock includes a first interactive member and a second interactive member, the first interactive member has moving contact with the second interactive member during movement of the door between the opened position and the intermediate position absent power from the motor.

19. The vending machine of claim 17, wherein the motor is configured to power movement of the lock during unlocking of the door.

20. The vending machine of claim 17, wherein the motor provides relative movement between the first and second interactive members during locking.

21. The vending machine of claim 17, wherein the motor includes a housing and a shaft, the shaft rotates relative to the housing during movement of the door from the intermediate position to the closed position, the shaft remains substantially stationary relative to the housing when the door moves from the opened position to the closed position.

22. The vending machine of claim 17, wherein the motor stops powering movement of the door when a threshold torque is detected.

23. The vending machine of claim 17, further comprising a sensor configured to activate the motor when the door reaches the intermediate position.

* * * * *